(12) United States Patent
Seydoux et al.

(10) Patent No.: US 7,755,361 B2
(45) Date of Patent: *Jul. 13, 2010

(54) APPARATUS AND SYSTEM FOR WELL PLACEMENT AND RESERVOIR CHARACTERIZATION

(75) Inventors: Jean Seydoux, Houston, TX (US); Emmanuel Legendre, Houston, TX (US); Reza Taherian, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/952,302

(22) Filed: Dec. 7, 2007

(65) Prior Publication Data

US 2008/0136419 A1 Jun. 12, 2008

Related U.S. Application Data

(63) Continuation-in-part of application No. 11/160,533, filed on Jun. 28, 2005.

(60) Provisional application No. 60/587,689, filed on Jul. 14, 2004.

(51) Int. Cl.
*G01V 3/00* (2006.01)

(52) U.S. Cl. .................... 324/333; 324/334

(58) Field of Classification Search ......... 324/338–343, 324/345–346, 333–334; 702/7, 11; 175/40, 175/45, 50
See application file for complete search history.

(56) References Cited

U.S. PATENT DOCUMENTS 4,739,325 A 4/1988 MacLeod 5,117,927 A 6/1992 Askew (Continued)

FOREIGN PATENT DOCUMENTS

EP 012009 6/1980

(Continued)

OTHER PUBLICATIONS

VA Korolev et al., "Electromagnetic Logging by a Lateral Magnetic Dipole. Perspectives of Electromagnetic Well Scanning," Geofizika Scientific-Production Company, Russia (1995).

(Continued)

*Primary Examiner*—Reena Aurora
(74) *Attorney, Agent, or Firm*—Darla Fonseca; Brigette L. Echols; Charlotte Rutherford

(57) ABSTRACT

A modular downhole apparatus to determine a formation property, the apparatus being incorporated into a drill string comprising one or more downhole tools and drill pipe, the drill pipe being of the same or various lengths, the modular downhole apparatus comprising a first module having one or more antennas, wherein the first module has connectors on both ends adapted to connect with the drill string; and a second module having one or more antennas, wherein the second module has connectors on both ends adapted to connect with the drill string; wherein the first module and the second module are spaced apart on the drill string; and wherein one or more of the one or more antennas of one or both of the modules has a dipole moment that is tilted or transverse.

26 Claims, 14 Drawing Sheets

U.S. PATENT DOCUMENTS

| | | |
|---|---|---|
| 5,157,605 A | 10/1992 | Chandler et al. |
| 5,661,402 A | 8/1997 | Chesnutt et al. |
| 5,955,884 A | 9/1999 | Payton |
| 6,057,784 A | 5/2000 | Schaff et al. |
| 6,181,138 B1 * | 1/2001 | Hagiwara et al. ........... 324/338 |
| 6,188,222 B1 | 2/2001 | Seydoux et al. |
| 6,294,917 B1 | 9/2001 | Nichols |
| 6,480,000 B1 | 11/2002 | Kong et al. |
| 6,525,540 B1 | 2/2003 | Kong et al. |
| 6,556,014 B1 | 4/2003 | Kong et al. |
| 6,594,584 B1 | 7/2003 | Omeragic et al. |
| 6,646,441 B2 | 11/2003 | Thompson et al. |
| 6,958,610 B2 | 10/2005 | Gianzero |
| 6,969,994 B2 | 11/2005 | Minerbo et al. |
| 6,998,844 B2 * | 2/2006 | Omeragic et al. ........... 324/343 |
| 7,093,672 B2 | 8/2006 | Seydoux et al. |
| 2003/0016020 A1 | 1/2003 | Gianzero |
| 2003/0085707 A1 | 5/2003 | Minerbo et al. |
| 2004/0183538 A1 | 9/2004 | Hanstein et al. |
| 2005/0140373 A1 | 6/2005 | Li et al. |
| 2006/0011385 A1 * | 1/2006 | Seydoux et al. ............... 175/61 |
| 2006/0033502 A1 | 2/2006 | Bittar |
| 2009/0015261 A1 | 1/2009 | Yang et al. |
| 2009/0302851 A1 | 12/2009 | Bittar et al. |

FOREIGN PATENT DOCUMENTS

| | | |
|---|---|---|
| RU | 2069878 | 11/1996 |
| RU | 2107313 | 3/1998 |
| SU | 817648 | 3/1981 |
| SU | 960701 | 4/1981 |
| SU | 998995 | 2/1983 |
| SU | 1004940 | 5/1983 |
| SU | 1246035 | 7/1986 |

OTHER PUBLICATIONS

"Double Electromagnetic and Lateral Logging," Methodical Handbook, Moscow, Nedra, Russian (1991).

Machetin et al., "TEMP—a New Dual-Electromagnetic and Leterolog Apparatus-Tech. Complex," 13th European Formation Evaluation Sym. Trans., Budapest Ch. SPWLA Paper K (1990).

* cited by examiner

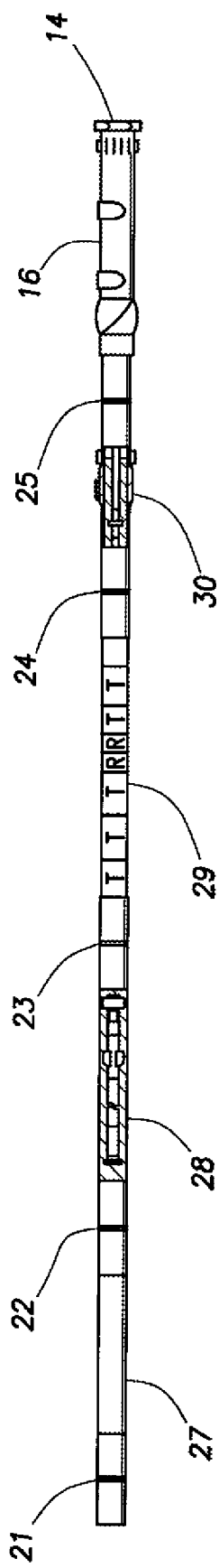
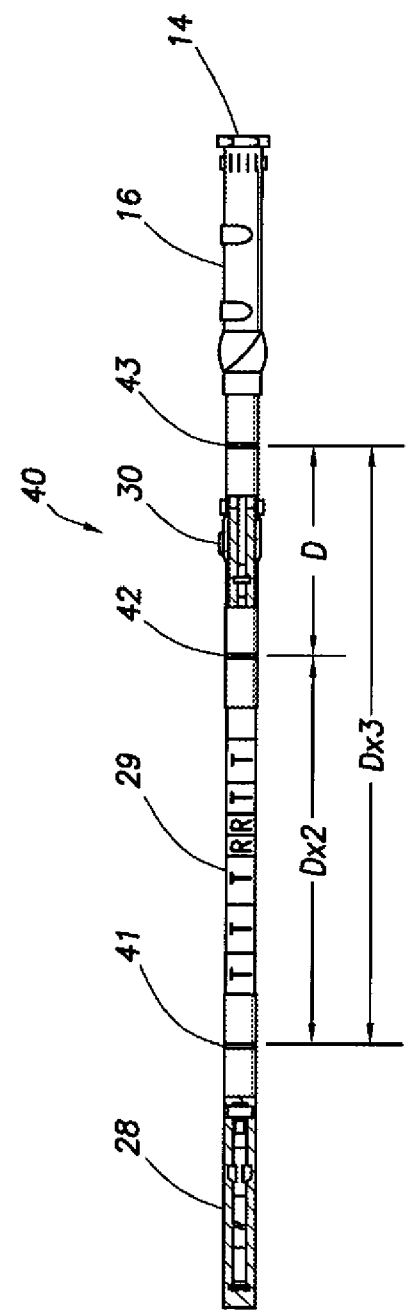
FIG.2
FIG.3

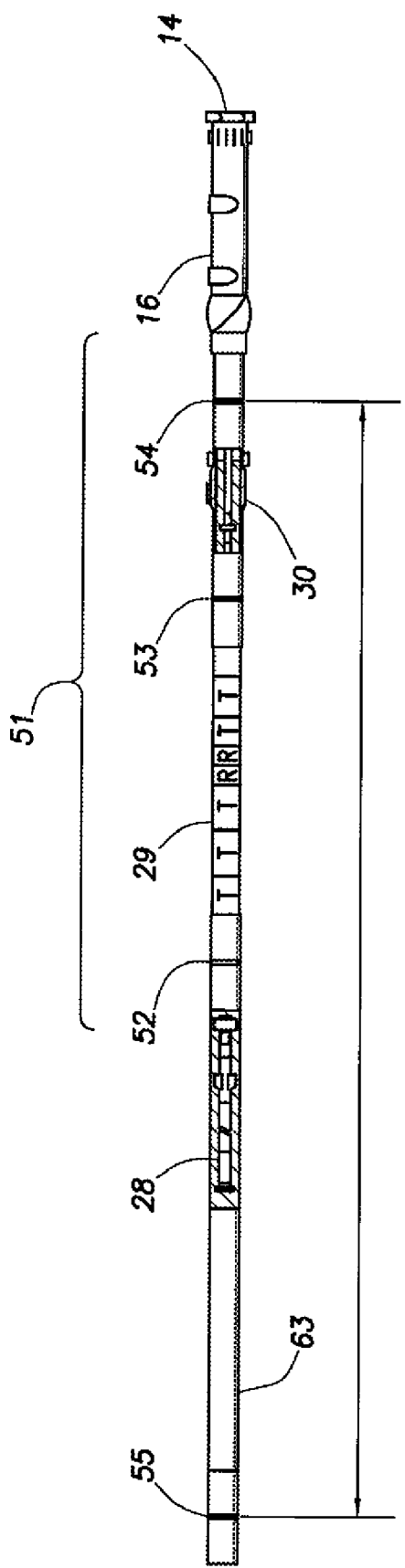
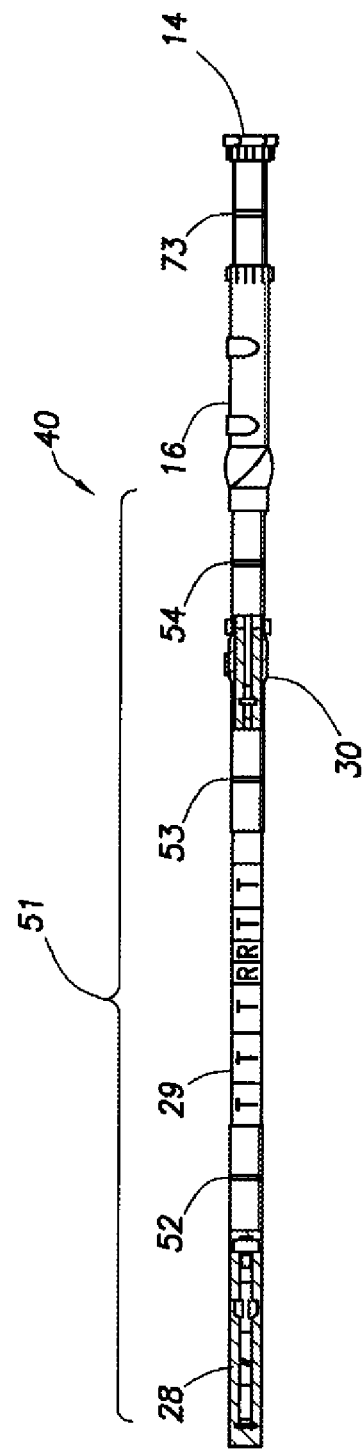
FIG.5
FIG.6

APPARATUS AND SYSTEM FOR WELL PLACEMENT AND RESERVOIR CHARACTERIZATION

CROSS-REFERENCE TO RELATED APPLICATIONS

This CIP application claims the benefit, under 35 U.S.C. §120, of U.S. application Ser. No. 11/160,533, filed on Jun. 28, 2005, which claims the benefit, under 35 U.S.C. §119, of U.S. Provisional Application Ser. No. 60/587,689, filed on Jul. 14, 2004.

BACKGROUND

1. Field of the Invention

This invention relates to the field of subsurface exploration and, more particularly, to techniques for determining subsurface parameters and well placement. The invention has general application to the well logging art, but the invention is particularly useful in logging while drilling (LWD), measurement-while-drilling (MWD), and directional drilling (geosteering) applications.

2. Background Art

Electromagnetic (EM) logging tools have been employed in the field of subsurface exploration for many years. These logging tools or instruments each have an elongated support equipped with antennas that are operable as sources (transmitters) or sensors (receivers). The antennas on these tools are generally formed as loops or coils of conductive wires. In operation, a transmitter antenna is energized by an alternating current to emit EM energy through the borehole fluid ("mud") and into the surrounding formation or formations. (As used herein, "formation" may refer to a single layer or may include multiple layers.) The emitted energy interacts with the borehole and formation to produce signals that are detected and measured by one or more receiver antennas. The detected signals reflect the interactions with the mud and the formation. The measurements are also affected by mud filtrate invasion that changes the properties of the rock near the wellbore. By processing the detected signal data, a log or profile of the formation and/or borehole properties is determined.

The processing of the measured subsurface parameters is done through a process known as an inversion technique. Inversion processing generally includes making an initial estimate or model of the geometry and properties of the earth formations surrounding the well logging instrument. The initial model parameters may be derived in various ways known in the art. An expected logging instrument response is calculated based on the initial model. The calculated response is then compared with the measured response of the logging instrument. Differences between the calculated response and the measured response are used to adjust the parameters of the initial model. The adjusted model is used to again calculate an expected response of the well logging instrument. The expected response for the adjusted model is compared with the measured instrument response, and any difference between them is used to again adjust the model. This process is generally repeated until the differences between the expected response and the measured response fall below a pre-selected threshold. U.S. Pat. No. 6,594,584 describes modern inversion techniques and is incorporated herein by reference in its entirety.

Well placement in real-time using resistivity measurements has been used by the industry since the availability of LWD and MWD tools. This application is commonly known as geosteering. In geosteering, estimation of the borehole position in real-time with respect to known geological markers is performed through correlation of resistivity log features. Because of the typically close placement of the resistivity sensors of a LWD tool along the drill collar relative to the transmitter, only limited radial sensitivity is attained, thereby limiting the extent of the formation geological model knowledge and estimation. With the introduction of sensors having transmitter-receiver distances in the tens of meters can a deeper radial sensitivity can be obtained.

Schlumberger's LWD Ultra Deep Resistivity or UDR™ induction tool, with large transmitter-receiver spacings in the tens of meters, has been successfully tested. One application of the tool has been to determine the location of an oil-water contact (OWC) 7-11 m away from the well path. U.S. Pat. No. 6,188,222, titled "Method and Apparatus for Measuring Resistivity of an Earth Formation" and issued to Seydoux et al., and U.S. Pat. No. 7,093,672, titled "Systems for Deep Resistivity While Drilling for Proactive Geosteering" by Seydoux et al., provide further descriptions of such tools and uses thereof. The '222 patent and the '672 patent are assigned to the assignee of the present invention and are incorporated by reference in their entireties.

The LWD ultra deep resistivity basic tool configuration comprises two independent drilling subs (one transmitter and one receiver) that are placed in a BHA among other drilling tools to allow large transmitter-receiver spacing. The basic measurements obtained with this tool consist of induction amplitudes at various frequencies, in order to allow detection of various formation layer boundaries with resistivity contrasts having a wide range of resistivities. The measurements are used to invert for an optimum parameterized formation model that gives the best fit between actual tool measurements and the expected measurements for the tool in such a formation model.

FIG. 1 shows an example of an MWD tool in use. In the configuration of FIG. 1, a drill string 10 generally includes kelly 8, lengths of drill pipe 11, and drill collars 12, as shown suspended in a borehole 13 that is drilled through an earth formation 9. A drill bit 14 at the lower end of the drill string is rotated by the drive shaft 15 connected to the drilling motor assembly 16. This motor is powered by drilling mud circulated down through the bore of the drill string 10 and back up to the surface via the borehole annulus 13a. The motor assembly 16 includes a power section (rotor/stator or turbine) that drives the drill bit and a bent housing 17 that establishes a small bend angle at its bend point which causes the borehole 13 to curve in the plane of the bend angle and gradually establish a new borehole inclination. The bent housing can be a fixed angle device, or it can be a surface adjustable assembly. The bent housing also can be a downhole adjustable assembly as disclosed in U.S. Pat. No. 5,117,927, which is incorporated herein by reference. Alternately, the motor assembly 16 can include a straight housing and can be used in association with a bent sub well known in the art and located in the drill string above the motor assembly 16 to provide the bend angle.

Above the motor assembly 16 in this drill string is a conventional MWD tool 18, which has sensors that measure various downhole parameters. Drilling, drill bit and earth formation parameters are the types of parameters measured by the MWD system. Drilling parameters include the direction and inclination of the BHA. Drill bit parameters include measurements such as weight on bit (WOB), torque on bit and drive shaft speed. Formation parameters include measurements such as natural gamma ray emission, resistivity of the formations, and other parameters that characterize the formation. Measurement signals, representative of these downhole parameters and characteristics, taken by the MWD system are transmitted to the surface by transmitters in real time or recorded in memory for use when the BHA is brought back to the surface.

Although the prior art deep-reading resistivity tools (such as UDR) proved to be invaluable in geosteering applications, there remains a need for further improved deep-reading resistivity tools that can be used in geosteering and/or other applications.

SUMMARY

One aspect of the invention relates to a resistivity array having a modular design. A resistivity array in accordance with one embodiment of the invention includes a transmitter module with at least one antenna, wherein the transmitter module has connectors on both ends adapted to connect with other downhole tools; and a receiver module with at least one antenna, wherein the receiver module has connectors on both ends adapted to connect with other downhole tools; and wherein the transmitter module and the receiver module are spaced apart on a drill string and separated by at least one downhole tool. Each transmitter and receiver module may comprise at least one antenna coil with a dipole moment orientation not limited to the tool longitudinal direction. In the case of more than one antenna, all or some antenna orientation vectors may be linearly independent. A set of vectors are linearly independent if and only if the matrix constructed from concatenating horizontally the vector's component has a rank equal to the number of vectors.

Another aspect of the invention relates to resistivity tools. A resistivity tool in accordance with one embodiment of the invention includes a tool body adapted to move in a borehole; and at least three modules (subs) disposed on the tool body, wherein the at least three modules are not equally spaced along a longitudinal axis of the tool body, such that a combination of the at least three modules comprises a resistivity array of different spacings.

Another aspect of the invention relate to resistivity tools. A resistivity tool in accordance with one embodiment of the invention includes a tool body adapted to move in a borehole; a resistivity sensor disposed on the tool body and comprising a plurality of modules forming at least one array; and an additional antenna disposed on the tool body and spaced apart from the resistivity sensor along a longitudinal axis of the tool body, wherein the additional module and one of the plurality of modules in the resistivity sensor form an array having a spacing greater than about 90 feet.

Another aspect of the invention relates to logging-while-drilling tools. A logging-while-drilling tool in accordance with one embodiment of the invention includes a drill bit disposed at one end of a drill string; a first module disposed on the drill string proximate the drill bit or in the drill bit, and at least one additional module disposed on the drill string, and spaced apart from the first module, wherein the first module has at least one antenna with dipole moment orientation not limited to the longitudinal direction, and wherein the at least one additional module comprises three antennas whose dipole moment orientations are linearly independent.

Another aspect of the invention relates to a method for formation resistivity measurements. A method for formation resistivity measurements in accordance with one embodiment of the invention includes transmitting electromagnetic energy into a formation using a transmitter antenna in a resistivity array, wherein the transmitting is performed with a plurality of frequencies according to a selected pulse scheme; and detecting, for each of the plurality of frequencies, a signal induced in a receiver antenna spaced apart from the transmitter antenna in the resistivity array.

Another aspect of the invention relates to a method for designing a resistivity array. A method for designing a resistivity array in accordance with one embodiment of the invention includes estimating a thickness of a reservoir; and disposing a transmitter and a receiver on a drill string such that the spacing between the transmitter and the receiver is no less than the estimated thickness of the reservoir.

Other aspects of the invention will be apparent from the following description and the appended claims.

BRIEF DESCRIPTION OF DRAWINGS

FIG. 2 shows a resistivity array in accordance with one embodiment of the present invention.

FIG. 3 shows a resistivity array in accordance with another embodiment of the present invention.

FIG. 5 shows a resistivity array in accordance with one embodiment of the present invention.

FIG. 6 shows a resistivity array in accordance with one embodiment of the present invention.

DETAILED DESCRIPTION

Figure 1:
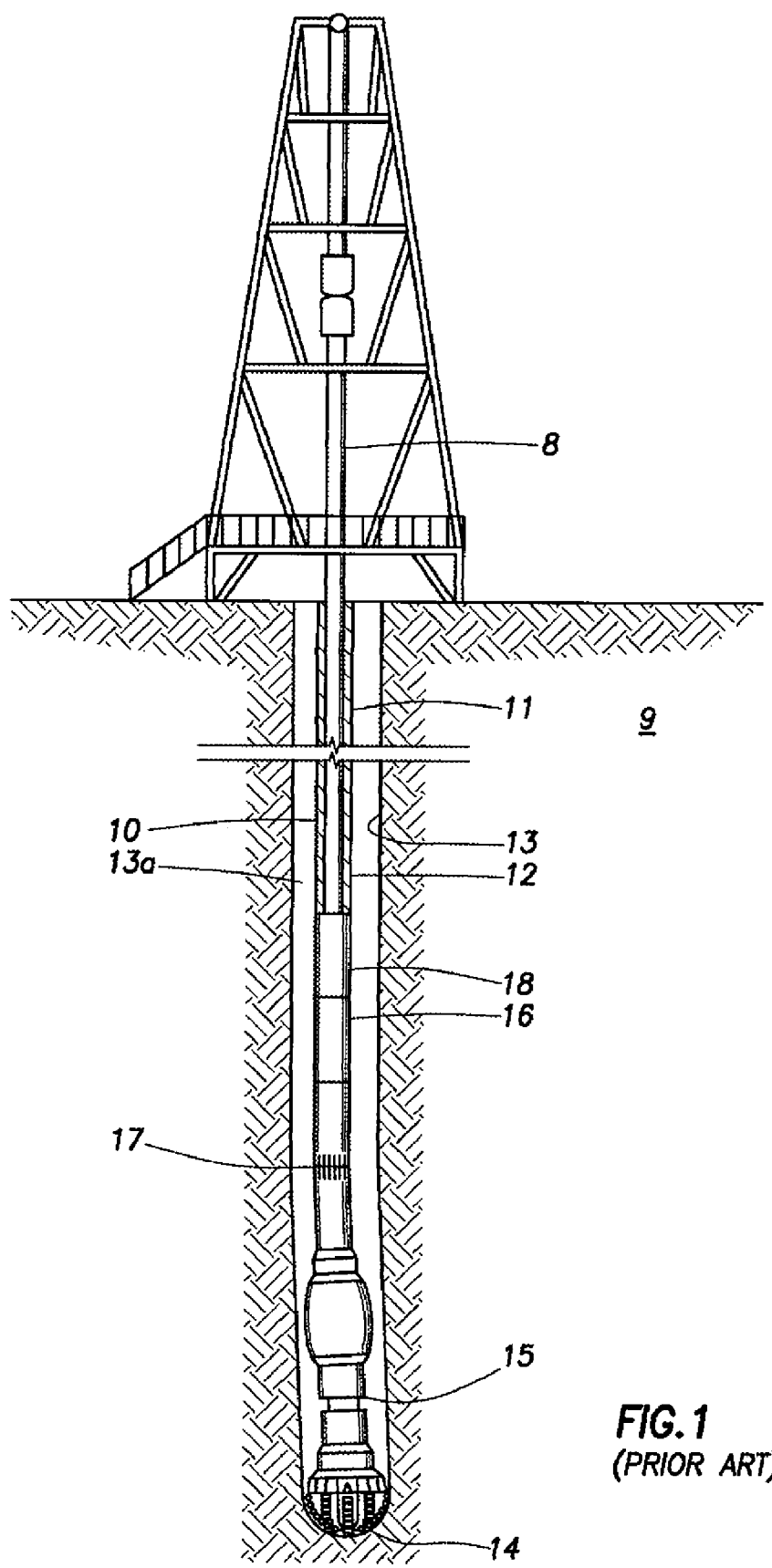
FIG. 1 shows a prior art drilling rig and drill string that can be used with one embodiment of the invention.

Embodiments of the invention relate to resistivity arrays having improved properties. Some embodiments of the invention relate to methods of using these tools in formation evaluation. Embodiments of the invention may permit inversion for more complicated formation models (i.e., formation model with more parameters) and/or may improve the robustness of resistivity measurement inversion (uncertainty reduction). Some embodiments of the invention may increase the flexibility of formation resistivity evaluation by providing more measurements, each of which may have different responses to different formation models.

Some embodiments of the invention provide resistivity arrays having a modular design. The modular design facilitates setting up different tool configurations for different measurement requirements. For example, by extending the number of transmitter-receiver combinations (for example, one embodiment with four transmitters and one receiver, forming four transmitter-receiver arrays), more depths of investigation can be obtained.

Some embodiments of the invention may include antennas that can function as a transceiver (i.e., as a transmitter and a receiver). This further provides tool configuration flexibility. In this implementation, for the same number of modules, a greater number of transmitter-receiver combinations can be achieved. Also, symmetrization of directional measurement can be achieved, without extending the length of the tool, in a manner similar to that described in U.S. Pat. No. 6,969,994, by Minerbo et al. Some embodiments of the invention relate to tools having a transmitter sub at a great distance from the receiver (e.g., >90 ft) to allow selective sensitivity to reservoir complexity. Such an embodiment may have an independently powered transmitter sub placed outside (far away from) a conventional bottom hole assembly.

Some embodiments of the invention relate to placement of a transmitter at or inside the drill bit, or very close to the drill bit, for look-ahead capability. Such an embodiment may have an independently powered system and data communication capability.

Some embodiments of the invention relate to having at least one module located in a separate well or borehole.

Some embodiments of the invention relate to methods of formation resistivity evaluation using measurement frequencies tailored to the expected formation. The frequency range, for example, may be up to 200 KHz.

Some embodiments of the invention related to combining modules of the invention with existing LWD resistivity arrays.

Some embodiments of the invention relate to coil designs that have multiple windings to permit the use of the same antenna for a wide range of frequencies. The multiple windings may be connected in series or parallel.

Some embodiments of the invention relate to extension of the amplitude measurement to phase, relative phase, relative amplitude, as well as phase shift and attenuation (propagation) that requires a sub to include two receiver antennas with relatively long spacing (in the ten feet range).

Some embodiments of the invention relate to implementation of directional antennas (co-located or in close proximity) with or without metallic shields.

Tool Modularity

Some embodiments of the invention relate to resistivity arrays having modular designs. As used herein, a "resistivity array" is a configuration that includes at least one receiver antenna and at least one transmitter antenna attached at different locations on a drill string. A module may have one or more antennas. The modular design allows the transmitter and receiver antennas to be placed at various locations within a BHA, or at locations in the drill string above the BHA. For example, FIG. 2 shows a resistivity array including four transmitter modules 21, 22, 23, 24 and one receiver module 25 placed among other LWD or MWD tools 27, 28, 29, 30 in a BHA. By inserting transmitter and/or receiver modules at different locations on a standard BHA, as shown in FIG. 2, or a drill string, specific depths of investigation can be implemented to optimize the formation model inversion process that uses such deep resistivity measurements. For example, in one embodiment, transmitter module 21 may be about 90 to 100 feet from receiver module 25. In addition, one or more modules may be placed in a nearby borehole to provide a large spacing array.

The above-mentioned '672 patent discloses an ultra-deep resistivity array that may include transmitter and receiver modules. The '672 patent discusses the relationship between depth of investigation ("DOI") and the spacing between a transmitter and a corresponding receiver antenna, the relationship being that greater spacing results in a corresponding increase in DOI. The present inventors have found that the relationship holds true; however, increasing the spacing complicates the ability for a receiver to pickup and couple the signals from a transmitter. Embodiments of the present invention may use a tri-axial antenna in a transmitter or receiver module, wherein the tri-axial antenna module has three antennas having magnetic moments in three different directions. The tri-axial antenna module will ensure that at least some of the transverse components of the tri-axial antenna can form substantial coupling with the transverse component of a corresponding transmitter or receiver. The use of a tri-axial antenna transceiver (or receiver) is advantageous because when the drill string is made up, it would be difficult to ensure that a single antenna transmitter will align with a single antenna receiver, with that difficulty increasing as the spacing increases. In contrast, the tri-axial antenna transceiver (or receiver) will always have a component substantially aligned with the magnetic moment of a corresponding receiver (or transceiver) in the resistivity array. In addition, tri-axial antennas allow the determination of formation characteristics such as dip angle, anisotropy, shoulder bed effects.

Figure 4:
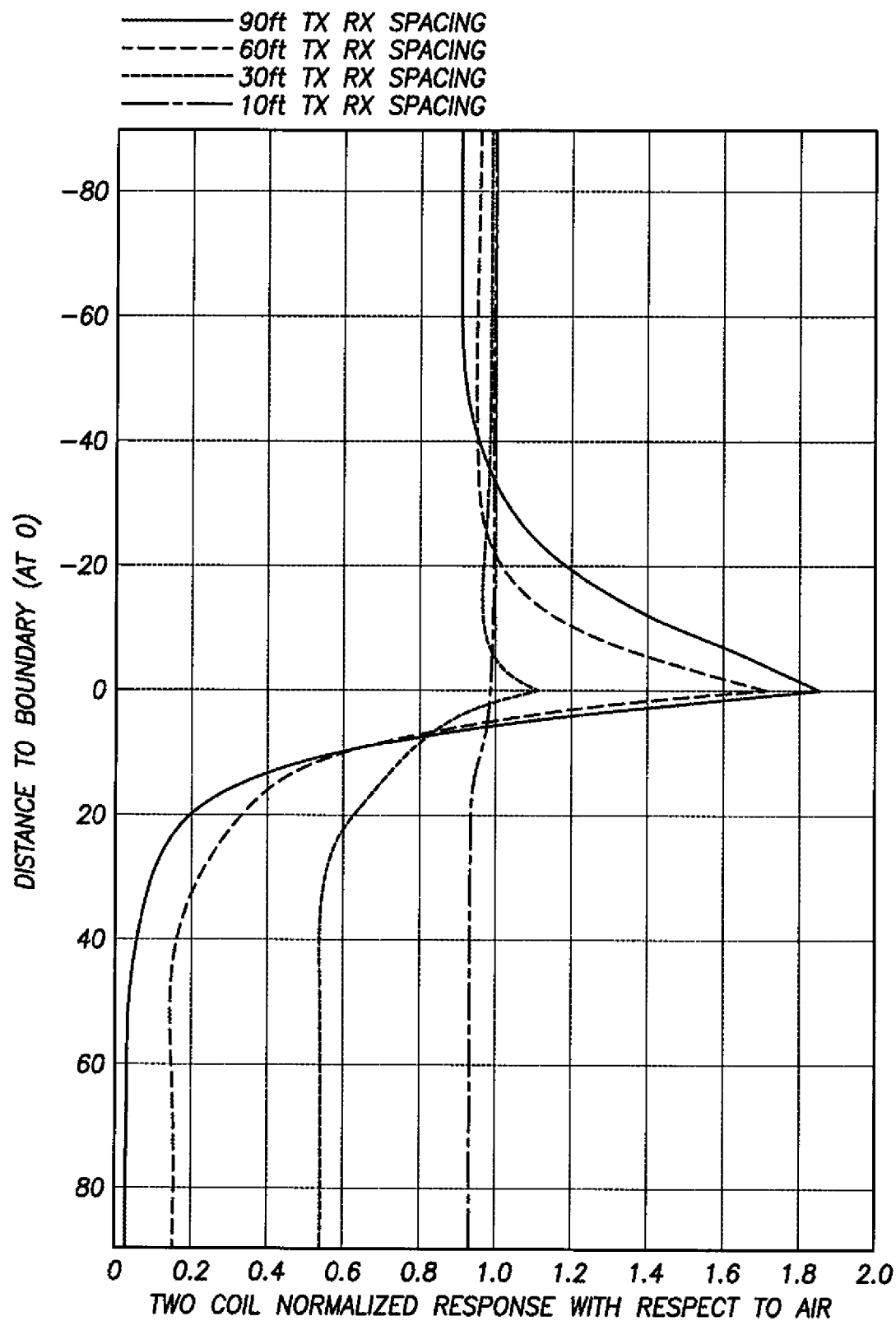
FIG. 4 shows examples of depth of investigation for a 10 kHz amplitude measurement obtained with various transmitter-receiver distances in accordance with one embodiment of the present invention.

FIG. 4 shows examples of depth of investigation for a 10 kHz amplitude measurement obtained with transmitter-receiver distances of 10, 30, 60 and 90 ft in the presence of a boundary with resistivity contrast of 1 to 10 ohms. The drill string (hence the resistivity array) is assumed parallel to the boundary and at various distances away from the boundary. As shown in FIG. 4, the 10 ft array is not very sensitive to the boundary; it shows only slight magnitude changes in the vicinity of the boundary. The 30 ft array is more sensitive, showing a distinct transition at the boundary. The 60 ft array is even more sensitive; it shows a very pronounced resistivity transition around the boundary. At this transmitter-receiver spacing, the signal magnitude starts to change at about 20-40 ft away from the boundary. With the 90 ft array, the signal magnitude change is even more profound. It is apparent that a combination of different depths of investigation allows differentiations of geological formation at different radial distances. The modular design makes it easy to configure the tools for different array spacing. Further, the use of one or more tri-axial antennas as transmitters and/or receivers increases the spacing that may be achieved, which provides a corresponding increase in DOI.

Modular Subs as Transceivers

Some embodiments of the invention relate to resistivity array designs having transceiver antennas. In these tools, the antennas are not designed as separate transmitters or receivers. Instead, the same antenna can function as either a transmitter or a receiver. Such enhancement, besides being economically advantageous, allows more depths of investigation for the same number of subs, as illustrated in FIG. 3.

FIG. 3 shows a tool assembly 40 having three subs 41, 42, 43 that form two arrays with spacing of D and D×2. Because the antennas 41 and 43 can function as a transmitter or a receiver, a third array having a spacing of D×3 is also available with this tool configuration. Moreover) with the transceiver antennas, directional measurements can also be performed without having to have both transmitter and receiver belonging to a common downhole tool. For example, a set of symmetrized measurements may be obtained first with antenna 41 as the transmitter and antenna 43 as the receiver, then with antenna 43 as the transmitter and antenna 41 as the receiver.

Remote Subs as Transmitter/Transceivers

Some embodiments of the invention relate to tools having antenna subs placed far from other BHA tools (e.g., the receivers or transmitters). Wells often have curves and bends that limit the practical length of a BHA. Thus, conventional resistivity tools cannot have transmitters and receivers spaced farther than the practical length limit of the BHA (about 150 feet). Such tools cannot provide the depth of investigation that might be needed when placing a well path within a reservoir with a thickness that exceeds the maximum practical length of a standard drilling tool assembly.

FIG. 5 shows a resistivity array incorporating a remote sub in accordance with one embodiment of the invention. As shown, the resistivity array includes a conventional UDR 51 in the BHA. The UDR includes three antennas (transmitters, receivers, or transceivers) 52, 53, 54. Further up the drill string, the resistivity array also includes a remote module 55, which includes a transmitter, a receiver, or a transceiver. The antenna in the remote module 55 may be used with any of the antennas 52, 53, 54 to form an array having a large spacing. By using a remote module 55 with other conventional resistivity tools in the BHA, transmitter-receiver distances (i.e., array spacing) can be set to any desired distance. The remote module 55 may be independently powered. Furthermore, the remote module 55 may be operated by wireless telemetry, for example. In one embodiment, one or more drill collars 63 may be located between the remote module 55 and one or more of the antennas 52, 53, 54.

The location of the remote module 55 may be selected to be on the order of (or greater than) the reservoir thickness. Having an array spacing on the order of (or greater than) the reservoir thickness can provide distinct advantages that are otherwise unavailable to conventional resistivity tools.

Figure 7A:
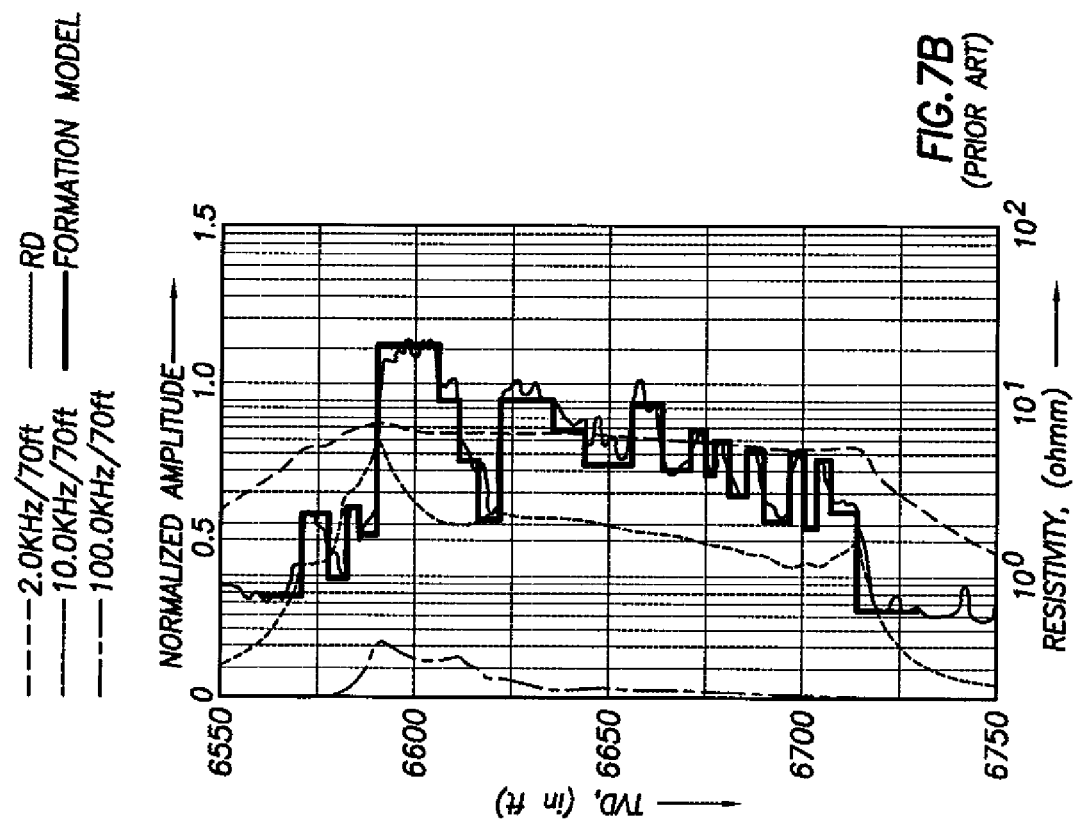
FIGS. 7A and 7B show amplitude responses of conventional prior art resistivity arrays.
Figure 7B:
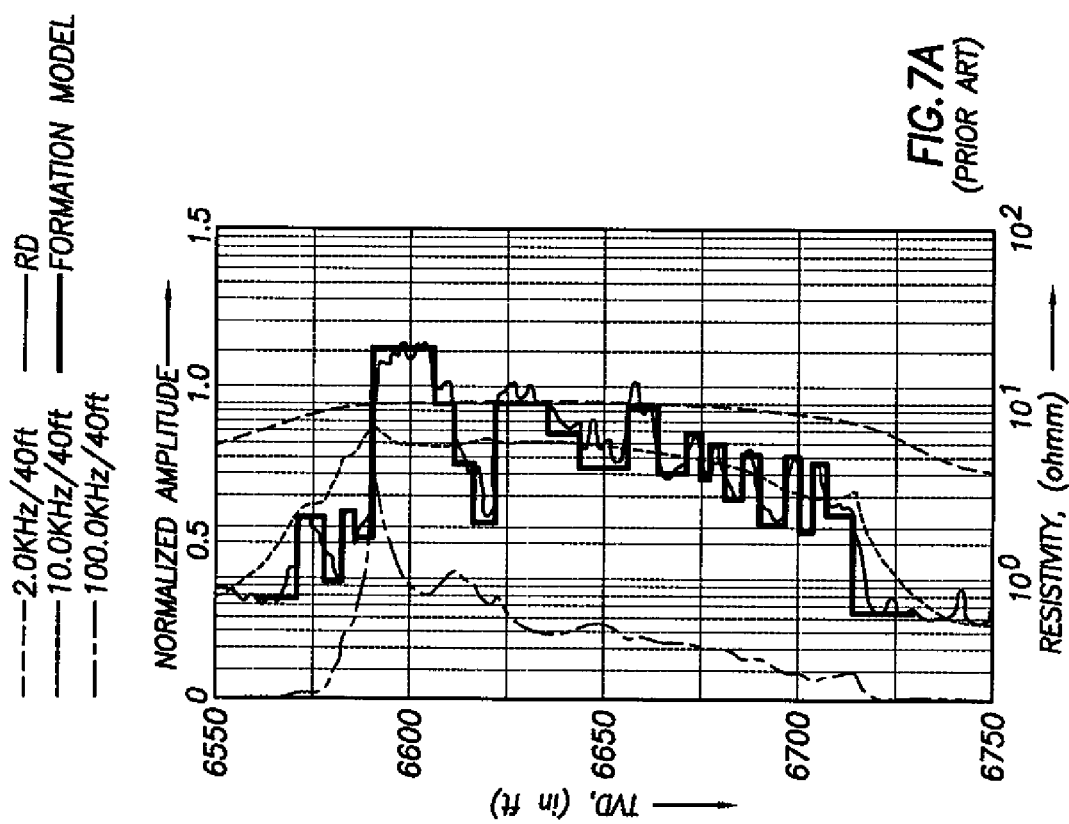
Figure 7D:
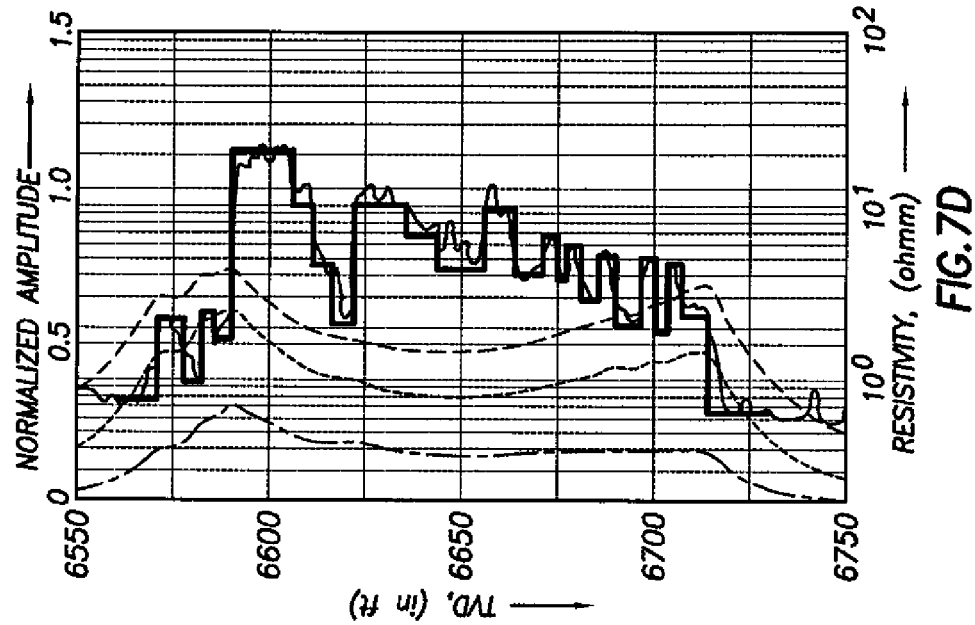
FIGS. 7C and 7D show amplitude responses of resistivity arrays in accordance with one embodiment of the present invention.
Figure 7C:
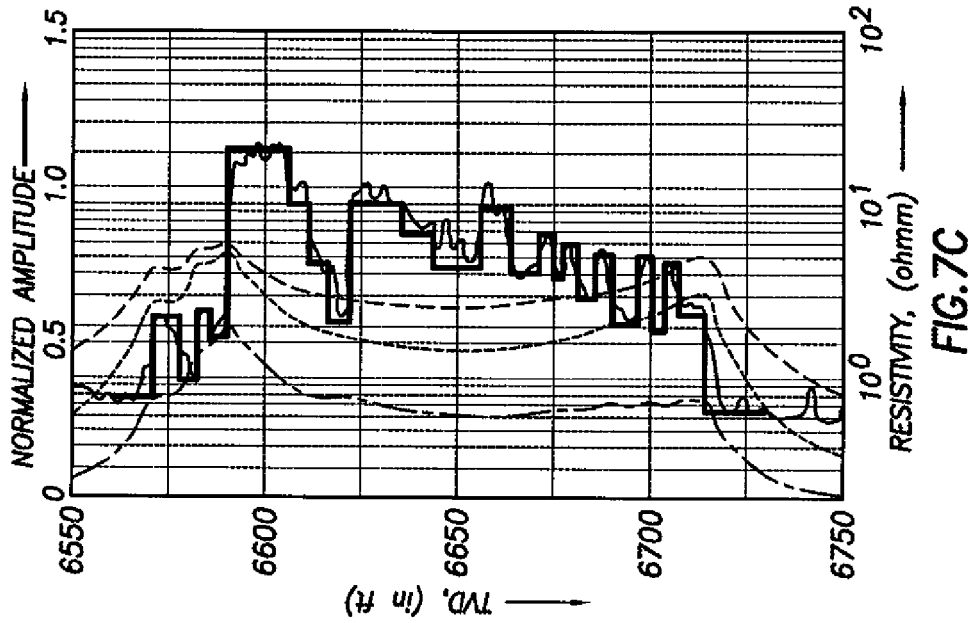

For example, FIGS. 7C and 7D show that the amplitude responses of the long array (the spacing of which is on the order of the bed thickness, 130 ft) are much simpler and clearly indicate where the bed boundaries are. The responses of this extra long array (especially at low frequencies) are not sensitive to the reservoir internal complexity. In contrast, as shown in FIGS. 7A and 7B, the amplitude responses of conventional prior art resistivity arrays (the spacing of which are smaller than the bed thickness, 130 ft) are more sensitive to resistivity variations within the bed, but less sensitive to bed boundaries. Results from FIGS. 7A-7D show that sensor distances (array spacing) and operational frequencies may be advantageously selected based on the properties of the reservoir being drilled, for example, the expected bed thickness or the ratio of the lowest reservoir layer resistivity and the resistivity of the cap and reservoir bottom.

Look-Ahead with Subs at the Bit

Some embodiments of the invention relate to resistivity tools having look-ahead ability. In accordance with embodiments of the invention, a sub may be placed proximate the drill bit in a way similar to that described in U.S. Pat. No. 6,057,784 issued to Schaff et al., and assigned to the assignee of the present invention. That patent is incorporated herein by reference in its entirety. In addition, an antenna can also be placed on a rotary steerable tool or directly inside a bit. By placing a transceiver at the bit, the resistivity measure point taken at the mid-distance between each transmitter/receiver pair is moved closer to the bit, thus allowing faster reaction time while drilling. This ability allows earlier real-time action to be taken to place the well based on geological events. Moreover, look-ahead of the bit is also possible by using the tool response tail that extends beyond a resistivity sensor pair.

FIG. 6 shows one example of a resistivity array in accordance with one embodiment of the invention. As shown, the resistivity tool 70 comprises a drill bit 14 at one end of the drill string. An antenna 73 (which may be a transmitter or a receiver antenna) is disposed on the drill string proximate the drill bit 14. In addition, the resistivity array includes a UDR 51 having three transceiver modules 52, 53, 34, which can function as receivers or transmitters. While three transceiver modules are shown in this example, one of ordinary skill in the art would appreciate that such a tool may have more or less transceiver modules. Further, receiver or transmitter modules may replace one or more of the transceiver modules. In one embodiment, antenna 73 may be a component of drill bit 14.

In accordance with some embodiments of the invention, the near-bit antenna 73 has a non-longitudinal magnetic moment, i.e., the magnetic moment of the antenna 73 is not in a direction parallel with the drill string axis. The non-longitudinal magnetic moment of the antenna 73 ensures that the antenna 73 has a component of the magnetic moment in the transverse direction (i.e., the direction perpendicular to the drill string axis). In addition, at least one of the transceiver modules (e.g., 52, 53, 54) comprises a tri-axial antenna, in which three antennas have magnetic moments in three different orientations. In some cases, the tri-axial antennas may have magnetic moments in three orthogonal orientations. The tri-axial antenna module will ensure that at least some of the transverse components of the tri-axial antenna can form substantial coupling with the transverse component of the near-bit antenna 73. The near-bit antenna 73 may be a transmitter, receiver, or a transceiver. In general, it is preferable for the near-bit antenna 73 to be a transmitter because a receiver antenna may see higher electrical noise from increase vibration and shock or from a possible presence of a high power rotary steerable tool. As a result, the motor assembly 16, which may include powered steering components, can disrupt a receiver antenna.

Multi-Frequency Measurement

Some embodiments of the invention relate to tools and methods that use multi-frequencies for resistivity measurements. In accordance with embodiments of the invention, frequencies may be selected to more efficiently cover the frequency spectrum in order to improve the inversion accuracy and flexibility of deep resistivity measurements. For example, in accordance with some embodiments of the invention, measurements may be acquired with a distribution of three or more frequencies per decade. These frequencies can be set or automatically selected, either before drilling or while drilling, to provide optimal formation inversion. The combination of transmitter-receiver distance with frequency is integral in the determination of reservoir outer boundaries with complex internal layer. The combination of antenna spacing and frequency are preferably selected to respect the following equation for maximum sensitivity.

We define the propagation coefficient k as: $k^2 = \epsilon\mu\omega^2 + i\sigma\mu\omega$, where $\epsilon$ is the electromagnetic permittivity, $\mu$, is the electromagnetic permeability, $\sigma$ is the conductivity, and $\omega$ is the angular frequency of the signal. If L represents the transmitter-receiver spacing, then we want $|k| \cdot L \in [0.1; 10]$. The frequencies are preferably chosen to meet this criterion.

Figure 8:
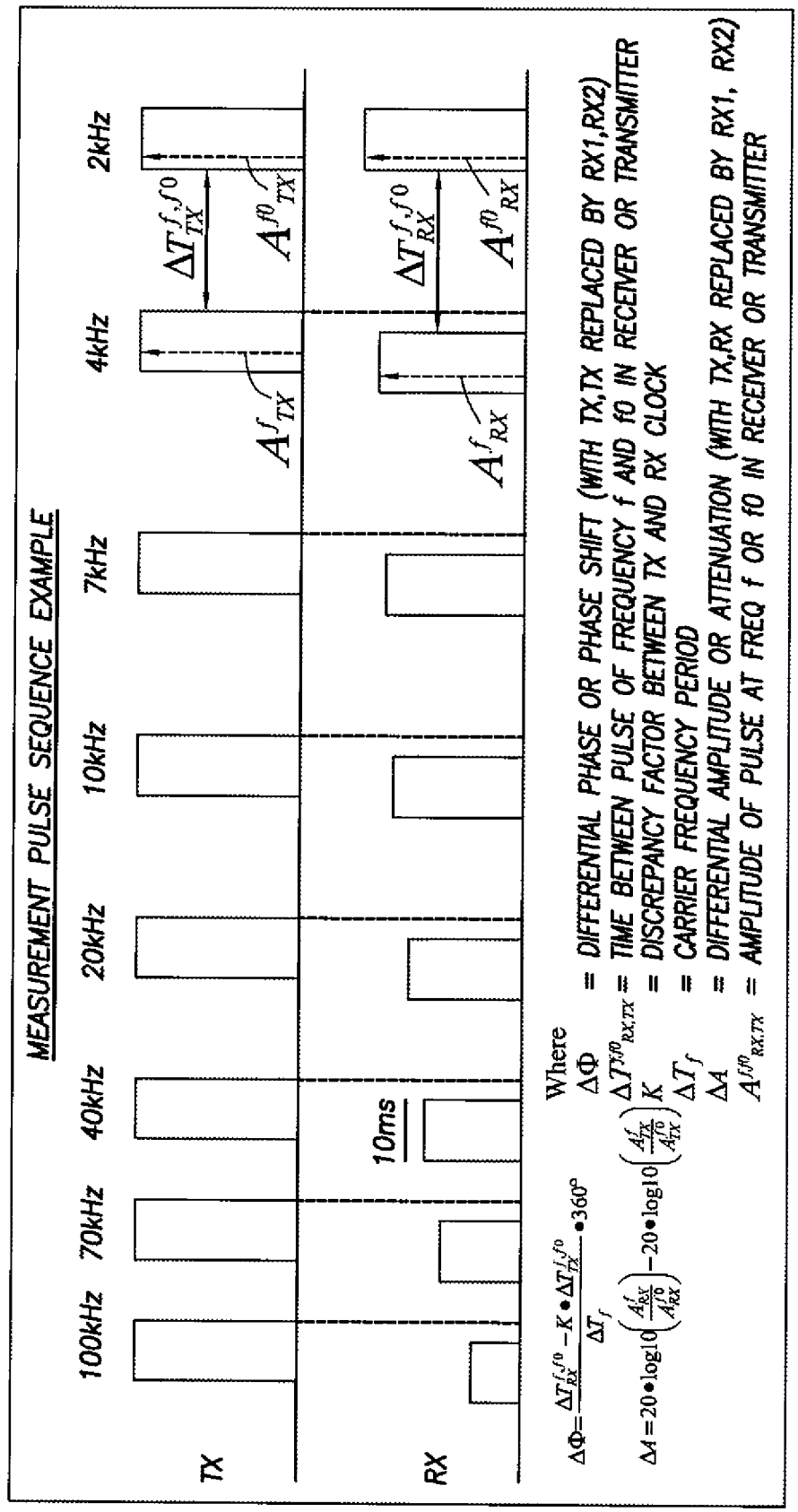
FIG. 8 shows a sequencing method in accordance with one embodiment of the present invention.

The multi-frequency measurements can be efficiently performed using any implementation scheme known in the art. For example, FIG. 8 shows an example of a resistivity measurement sequence for multi-frequency measurement. In the scheme shown in FIG. 8, all TX pulses are assumed to have a controlled amplitude. Furthermore, one of ordinary skill in the art would appreciate that in the pulse scheme, as shown in FIG. 8, a single pulse may be implemented to carry two or more frequencies. Signal measurements may be performed by measuring the true voltages as sensed by the receivers. Alternatively, the signals may be measured as differential signals between a pair of pulses of different frequencies.

Combination of Subs with Existing LWD Tools

Figure 9:
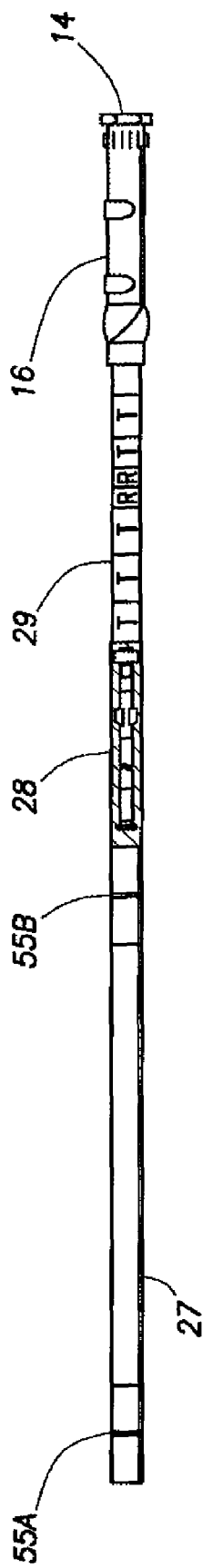
FIG. 9 shows a resistivity array in accordance with one embodiment of the present invention.

Some embodiments of the invention relate to resistivity arrays having remote subs, as described above, with other conventional resistivity tools. For example, FIG. 9 shows a tool including two remote sub transmitters, 55A and 55B, and a conventional LWD resistivity tool that may function as receivers for the remote transmitter modules to provide arrays with spacing much longer than what is possible with conventional resistivity arrays. One of ordinary skill in the art would appreciate that any conventional resistivity tool having one or more antennas for receiving resistivity signals may be used in combination with remote sub transmitters as disclosed herein. The option of running transmitter modules in combination with an existing "shallow" LWD tool (using their resistivity antennas as deep resistivity receivers) allows asset rationalization and integrated measurement capabilities.

Multi-winding Antenna

Some embodiments of the invention relate to antennas that may be used efficiently in a wide frequency range. When an antenna is used to transmit a signal at a certain frequency, the antenna is most efficient when the frequency is below the self-resonance frequency of the antenna. Therefore, when a particular antenna is used in a wide frequency range, the antenna may not be efficient in certain frequency ranges. For example, to transmit at the highest frequency, the number of turns in the antenna should be low enough to be below the coil self resonance. On the other hand, to be optimum in transmission at a lower frequency, the number of turns needs to be increased. As a result, conventional antennas often have windings that represent a compromise for the intended operational frequency range.

In accordance with some embodiments of the invention, an antenna may have several layers of windings; each of the layers may be either wired in parallel for high frequency or in series for a lower frequency to efficiently balance the impedance load of the antenna when driven with a constant voltage. The switching between serial and parallel configurations may be controlled electronically.

Figure 10:
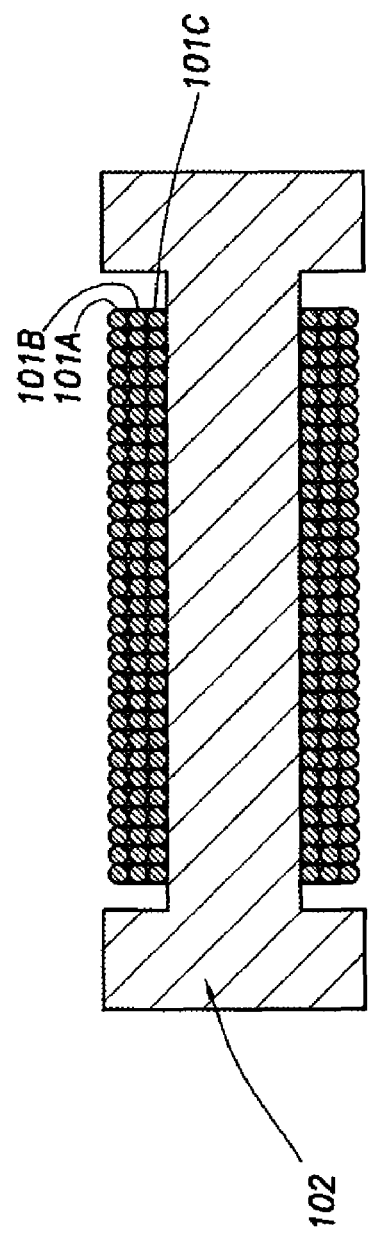
FIG. 10 shows an antenna module in accordance with one embodiment of the present invention.

FIG. 10 shows an exemplary antenna in accordance with one embodiment of the invention. Coil layers 101A-101C, in this example, are either connected in series to maximize the number of turns in the transmission at low frequency (for example, around 1 kHz range), or are connected in parallel for the higher frequency range (for example, 100 kHz). The coil layers 101A-101C are wrapped around a mandrel 102. One of ordinary skill in the art would appreciate that several layers of coils may be used in an antenna to provide finer tuning of the performance of the antenna.

Extension to Other Resistivity Measurement Techniques

Conventional deep resistivity measurements, such as that disclosed in U.S. Pat. No. 6,188,222, are based on induction mechanism and measures signal amplitudes, not phase or phase shifts or attenuations. Some embodiments of the invention relate to deep resistivity measurements based on propagation mechanism and measure phase shifts and attenuations (i.e., differential measurements), by introducing an extra receiver antenna with a spacing between the receiver pair on the order of 5 to 10 feet, which is significantly longer than the receiver pair spacing (typically limited to less than a foot) in a conventional propagation tool. The longer spacing between the receiver pair is desirable because of the lower frequencies used for deep EM measurement (1 to 200 kHz). A spacing between the receiver pairs on the order of 5 to 10 feet would ensure that the minimum phase shift that can be measured stays in the approximately 0.1 degree range.

In addition to using a receiver pair, differential measurements in phase and amplitude (i.e., phase shifts and attenuations) may also be performed with a proper pulse scheme, such as that shown in FIG. 8. The measurement scheme shown in FIG. 8 may use one (or more) of the transmitted pulses at a specific frequency as a time reference. Assuming a constant phase reference (or time difference) between pulses in the pulse train (this time difference can also be measured and communicated to the receiver via wireless telemetry), the phase reference (or time difference) for the received pulse trains can be determined with respect to the reference pulse.

The same technique (using the amplitude of a reference pulse for comparison) can also be applied to the amplitude ratio between each pulse in the pulse train and the reference pulse. In this case, the amplitude ratio at the transmitter may be kept constant or measured. The difference technique in pulse time of arrival and amplitude ratio reduces the dependence of the measurement on an accurate air calibration as needed for the amplitude measurement.

As an example, FIGS. 11A-11F show various measurements for a planar boundary with resistivity contrast of 1 and 100 ohms, using a tool having a transmitter-receiver spacing of 70 feet. This tool has transmitter and receiver antennas that have longitudinal magnetic moments (i.e., magnetic moments in a direction parallel with the longitudinal axis of the tool).

Figure 11A:
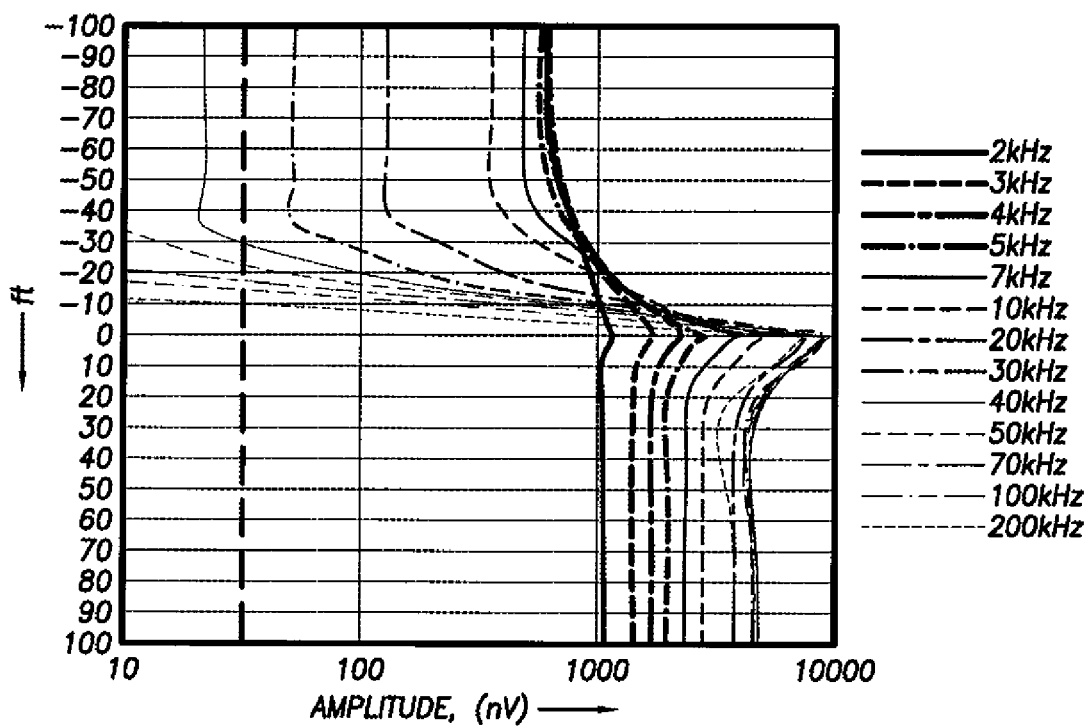
FIGS. 11A-11F show various measurements for a planar boundary with resistivity contrast according to one embodiment of the invention.
Figure 11B:
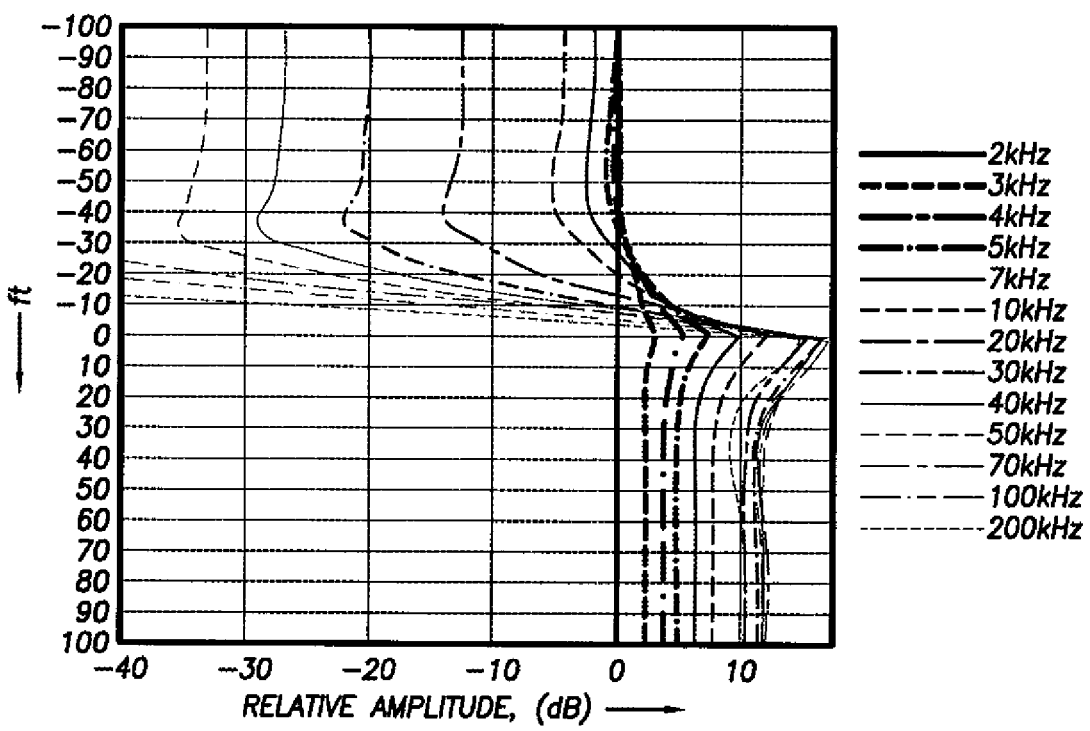
Figure 11C:
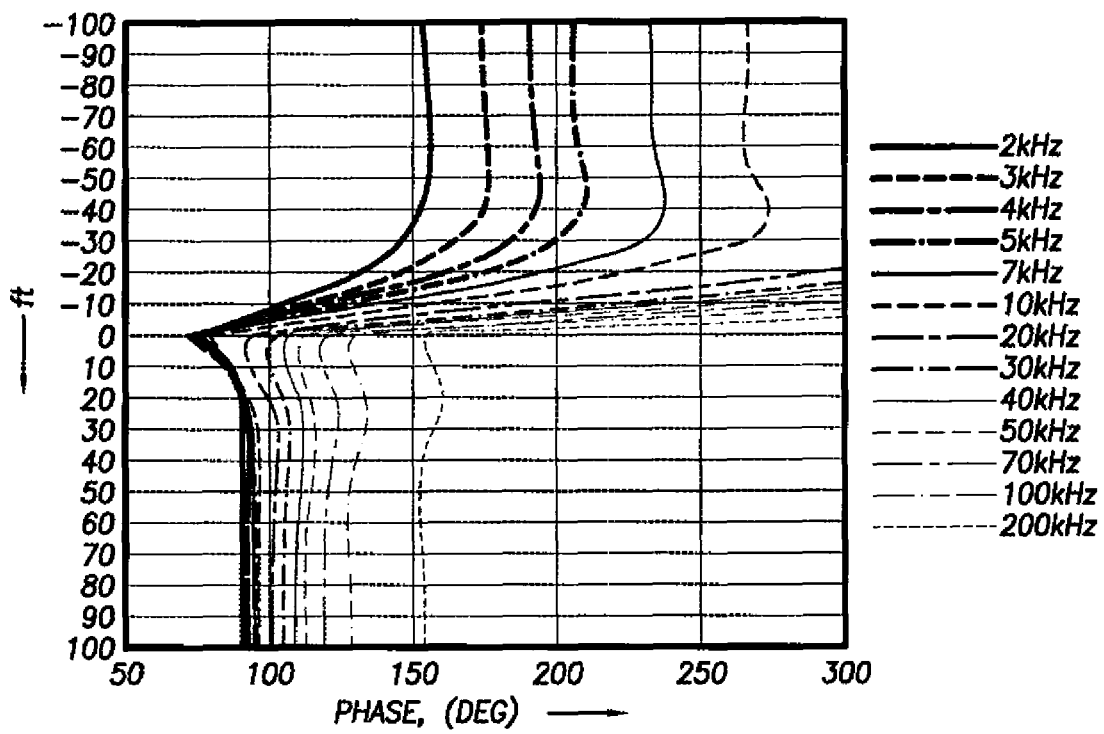
Figure 11D:
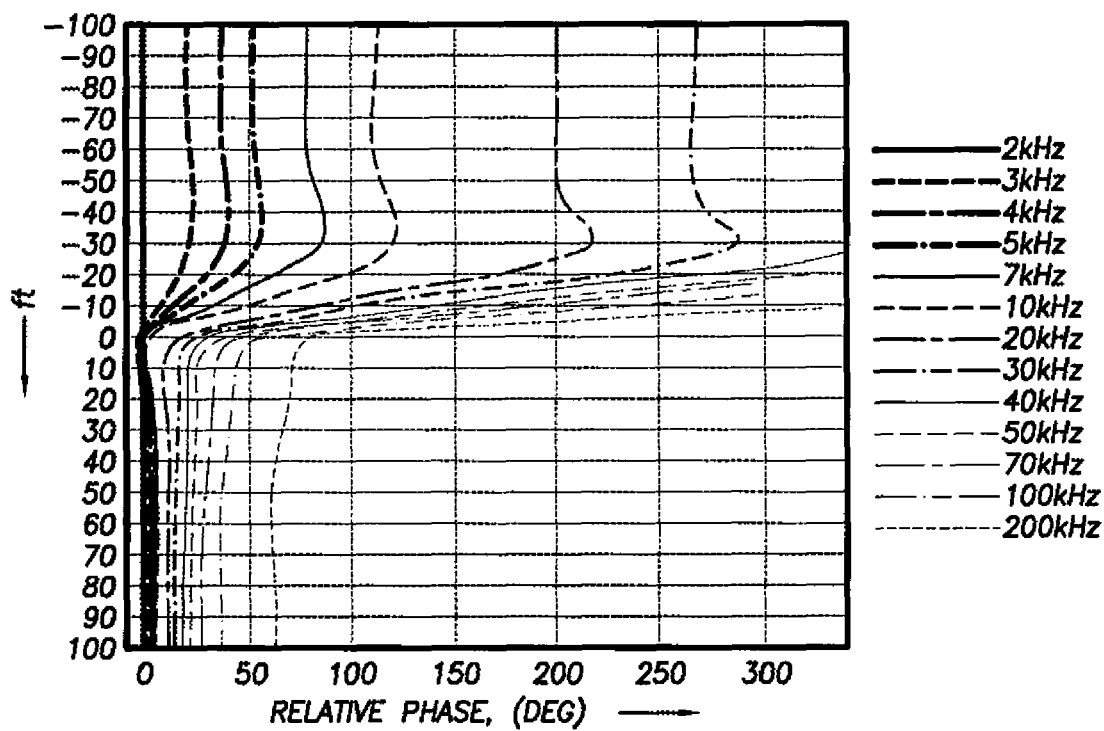

FIG. 11A and FIG. 11B show amplitude measurements and relative amplitude measurements, respectively, at various frequencies. In FIG. 11B, the relative amplitude measurements are with respect to the amplitude measurement at 2 KHz. FIG. 11C and FIG. 11D show phase measurements and relative phase measurements, respectively, at various frequencies. In FIG. 11D, the relative phase measurements are with respect to the phase measurement at 2 KHz.

Figure 11E:
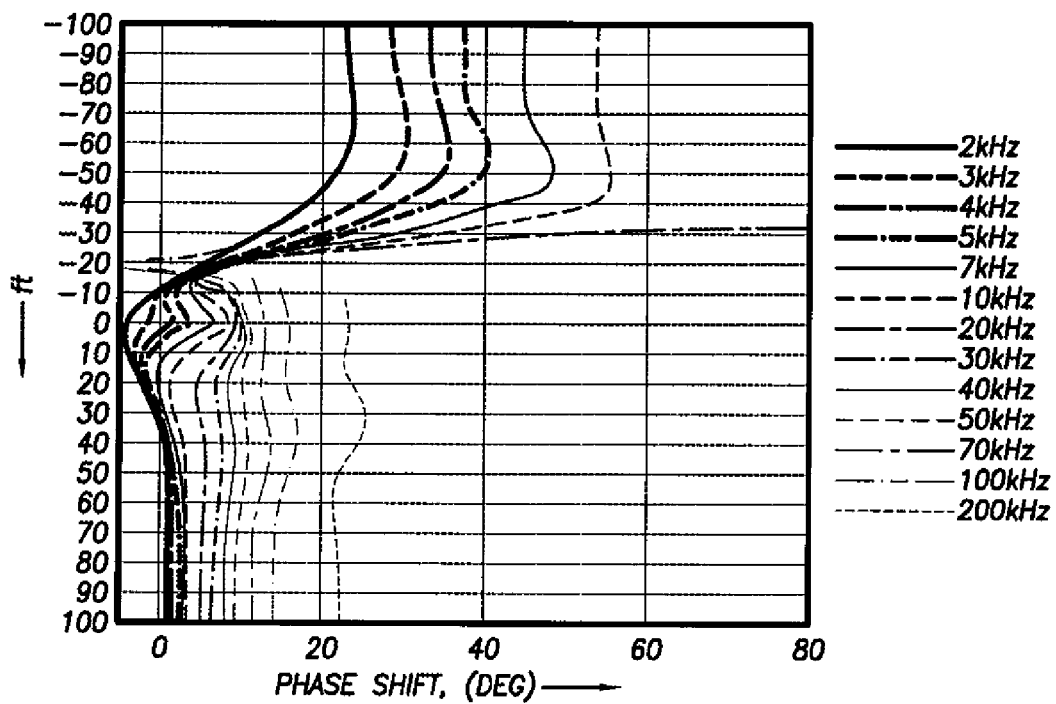
Figure 11F:
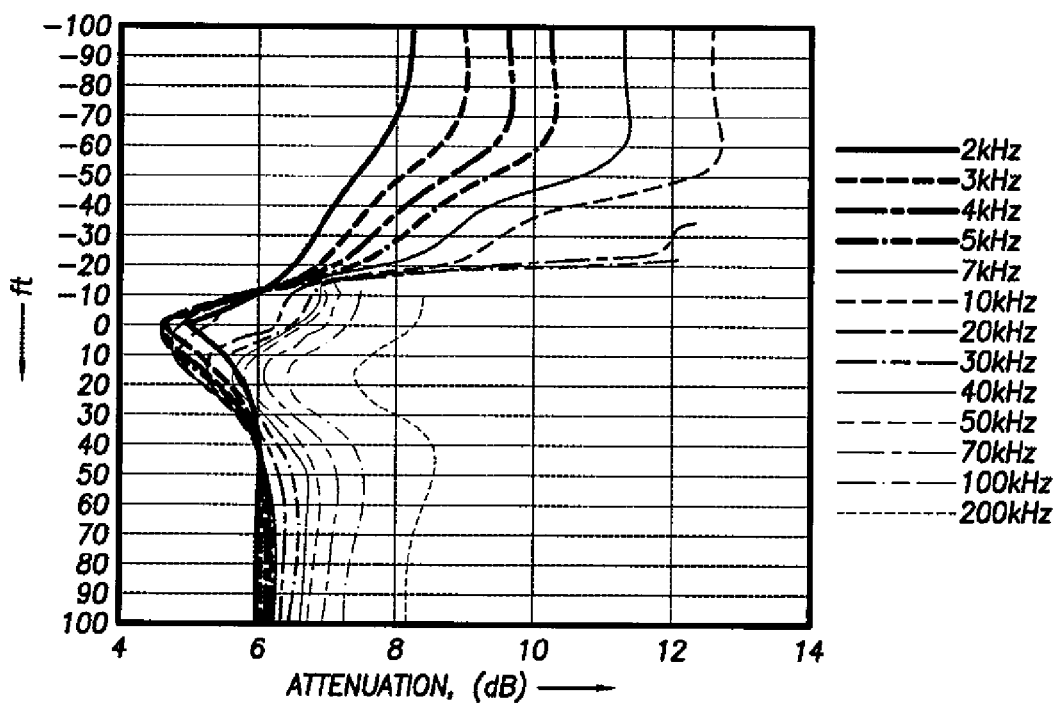

FIG. 11E and FIG. 11F show phase shift measurements and attenuations, respectively, at various frequencies, as measured with a pair receivers having an 8 feet spacing. With such a spacing, significant variations in phase shift and attenuation can be readily observed. Both measurements provide another set of measurements with a different sensitivity allowing more independent measurements to be used during the inversion process.

Some embodiments of the invention relate to geosteering. A method of geosteering in accordance with embodiments of the invention may use any resistivity array described above and/or measurement method described above (e.g., multi-frequency measurements, use of a pulse schemes, etc.). Measurements may yield, for example, a bed orientation angle, a bed boundary indicator, and a distance-to-bed boundaries. The bed orientation angle is the angle between a reference direction such as the negative of the gravitational acceleration vector and the normal to the plane of the bed. A bed boundary indicator may obtained, for example, from a symmetrized response using the electromagnetic coupling coefficients, though other response functions may also be used. As used herein, "formation properties" may include such formation parameters.

All measurements with the above-described embodiments of the invention can be extended to directional measurements. Directional measurements allow further sensitivity to the boundaries and will improve the inversion process accordingly. In some embodiments, the antenna(s) would have a transverse magnetic dipole combined with a normal "axial" antenna to provide both measurements from the same antenna. In a tri-axial antenna, as discussed above, one portion may be aligned with the axis of the BHA, while the other two portions are at angles relative thereto. Conventional shields can also be implemented with embodiments of the invention as desired. It will be appreciated that the antennas (and related electronics) of the embodiments of the invention may be implemented using one of many well-known antenna designs and packaging schemes. For example, the logging apparatus described in U.S. Pat. No. 6,188,222 may be used to implement the present invention.

While the above description uses logging-while-drilling tools to illustrate various embodiments of the invention, a tool of the invention is not limited by any particular mode of conveyance. Therefore, a tool of the invention may be used in, for example, logging-while-drilling, logging-while-tripping, coil tubing drilling, logging through the bit, liner drilling, and casing drilling operations.

While the embodiments described above generally refer to coil or loop-type antennas, other antenna types such as a toroid may be used. Coil or loop antennas may be considered to behave like a magnetic dipole, and toroid antennas may be considered to behave like an electric dipole. Thus, in each case, the antenna can be considered to have an electric or magnetic dipole moment.

Figure 12:
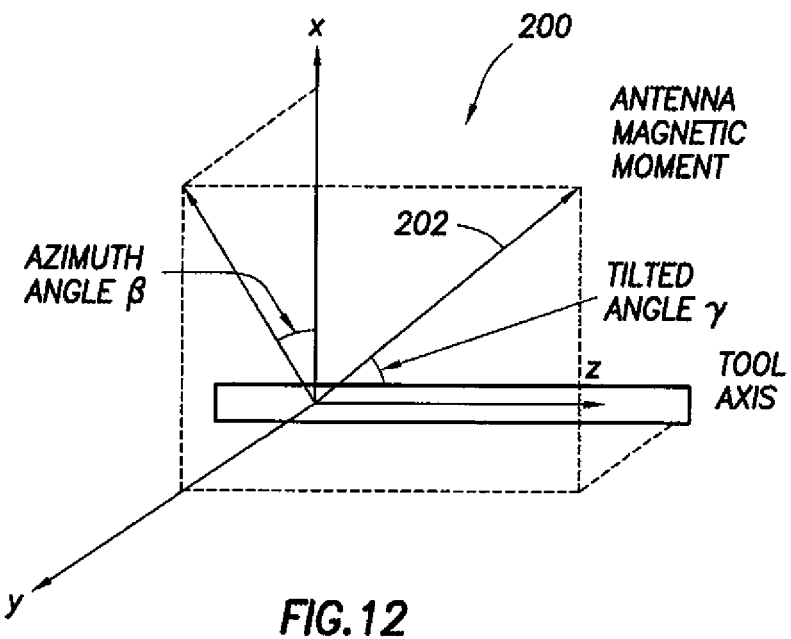
FIG. 12 shows an antenna module in accordance with one embodiment of the present invention.

To provide a directionally sensitive measurement, at least one antenna must be tilted or transverse. By "tilted", we mean having a tilt angle, the tilt angle being the angle between the dipole moment of the antenna and the longitudinal axis of the module (or a line parallel to it), wherein the angle is greater than zero but less than ninety degrees. By "transverse", we mean the angle between the dipole moment and the longitudinal axis of the module is 90 degrees. FIG. 12 shows a module 200 and a single antenna 202 in which antenna 202 has tilt angle $\gamma$ and azimuth angle $\beta$. The azimuthal angle $\beta$ is the angle between the x-axis of the module-fixed coordinate system and the projection of the dipole moment onto the x-y plane of the module-fixed coordinate system. The z-axis of the module-fixed coordinate system is along the longitudinal axis of the module, and the x and y axes complete the orthogonal, right-handed system.

Figure 13:
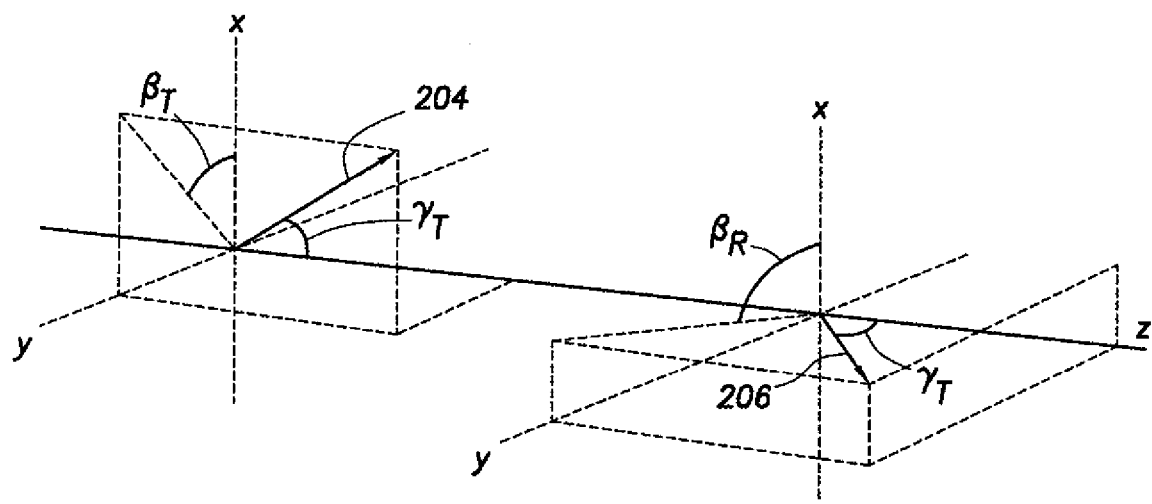
FIG. 13 shows an antenna module in accordance with one embodiment of the present invention.

FIG. 13 shows a single transmitter antenna 204 and a single receiver antenna 206. The transmitter antenna 204 has a tilt angle $\gamma_T$ and azimuth angle $\beta_T$. Receiver antenna 206 has a tilt angle $\gamma_R$ and azimuth angle $\beta_R$, though the tilt angles could be equal. The relative azimuth angle between the transmitter antenna 204 and receiver antenna 206 is $\beta$ which equals $\beta_R - \beta_T$. Antennas 204, 206 can be in the same module or on separate modules, as is true for all embodiments of the invention. By the principle of reciprocity, the roles of transmitters and receivers can be interchanged and those configurations are also within the scope of the invention.

Figure 14:
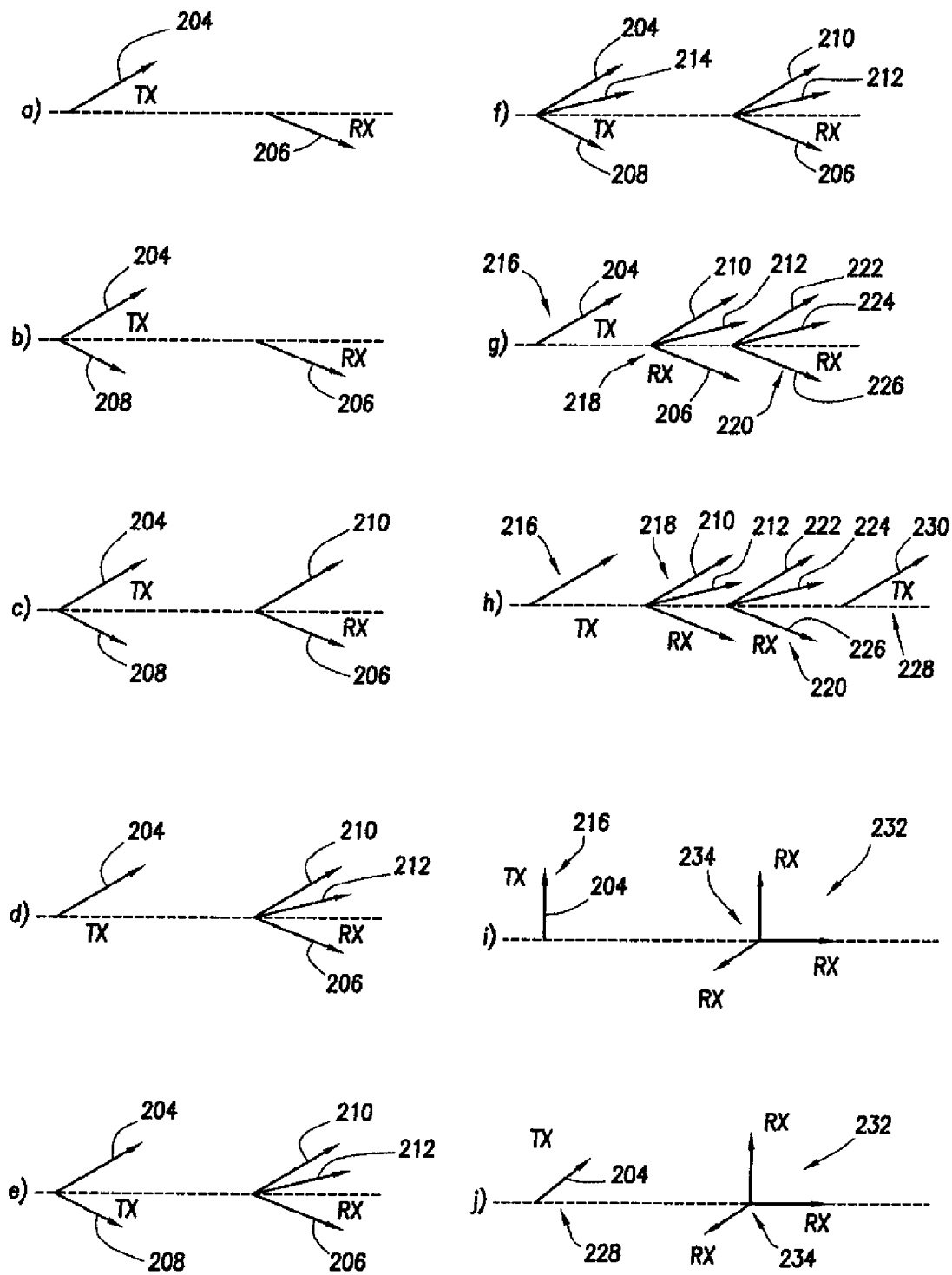
FIGS. 14(a)-14(j) show various antenna modules in accordance with various embodiments of the present invention.

FIG. 14 shows several exemplary antenna configurations. Configuration (a) shows a single transmitter 204 and single receiver 206 in which the tilt angles are different. The azimuth angles of the antennas are also different. Within the scope of the invention, each antenna has an azimuth angle and a tilt angle, and those angles may or may not be equal. A transmitter and a receiver comprise an antenna pair that can be used to make a measurement. Configuration (a) was disclosed in U.S. patent application Ser. No. 11/775,435 filed Jul. 10, 2007 and assigned to the Assignee of the present application.

Configuration (b) of FIG. 14 shows two transmitter antennas 204, 208 and a receiver antenna 206. Transmitter antennas 204, 208 are shown as co-located, but are not required to be. The tilt angles and azimuth angles of all antennas are independent of each other, and may or may not be equal. The two transmitter/receiver pairs allow for two measurements and comparatively more information may be obtained from those measurements.

Configuration (c) of FIG. 14 shows two transmitter antennas 204, 208 and two receiver antennas 206, 210. Transmitter antennas 204, 208 and receiver antennas 206, 210, respectively, are shown as co-located, but are not required to be. The tilt angles and azimuth angles of all antennas are independent of each other, and may or may not be equal. The four transmitter/receiver pairs allow for four measurements and comparatively more information may be obtained from those measurements.

Configuration (d) of FIG. 14 shows one transmitter antenna 204 and three receiver antennas 206, 210, 212. Receiver antennas 206, 210, 212 are shown as co-located, but are not required to be. The tilt angles and azimuth angles of all antennas are independent of each other, and may or may not be equal. The four transmitter/receiver pairs allow for four measurements and provide information comparable to the measurements made by configuration (c). Configuration (d) was disclosed in U.S. patent application Ser. No. 11/610,653 filed Dec. 14, 2006 and assigned to the Assignee of the present application. As disclosed in that application, such an antenna configuration allows all components of the electromagnetic coupling tensor to be determined.

Configuration (e) of FIG. 14 shows two transmitter antennas 204, 208 and three receiver antennas 206, 210, 212. Certain antennas are shown as co-located, but are not required to be. The tilt angles and azimuth angles of all antennas are independent of each other, and may or may not be equal. The six transmitter/receiver pairs allow for six measurements.

Configuration (f) of FIG. 14 shows three transmitter antennas 204, 208, 214 and three receiver antennas 206, 210, 212. Certain antennas are shown as co-located, but are not required to be. The tilt angles and azimuth angles of all antennas are independent of each other, and may or may not be equal. The nine transmitter/receiver pairs allow for nine measurements.

Configuration (g) of FIG. 14 shows three modules 216, 218, 220. Module 216 has a transmitter antenna 204. Module 218 has three receiver antennas 206, 210, 212 and module 220 has three receiver antennas 222, 224, 226. Certain antennas are shown as co-located, but are not required to be. The tilt angles and azimuth angles of all antennas are independent of each other, and may or may not be equal. The various measurements made by the different transmitter/receiver module pairs constitute absolute measurements that provide electromagnetic coupling information for two different depths of investigation. In addition, relative measurements may be obtained using measurements from the different receiver modules. For example, the difference between the signal received by, for example, receivers 206 and 222, based on a transmission from antenna 204, provides a relative measurement. Configuration (g) is one possible example of an embodiment having more than two modules, but other combinations are possible.

Configuration (h) of FIG. 14 shows four modules 216, 218, 220, 228. Module 216 has a transmitter antenna 204 and module 228 has a transmitter antenna 230. Module 218 has three receiver antennas 206, 210, 212 and module 220 has three receiver antennas 222, 224, 226. Certain antennas are shown as co-located, but are not required to be. The tilt angles and azimuth angles of all antennas are independent of each other, and may or may not be equal. This configuration allows for borehole compensated measurements. Other configurations that allow for borehole compensated measurements are also possible.

Configuration (i) shows a module 216 and a module 232. Module 216 has a transmitter antenna 204 in which antenna 204 is transverse. Module 232 has a tri-axial antenna 234. By "tri-axial antenna", we mean an antenna configuration having three antennas whose dipole moments lie on three orthogonal axes, and in which the dipole moment of one antenna is parallel with the longitudinal axis of the module. The tri-axial antennas may or may not be co-located. This embodiment shows one possible configuration in which transverse/transverse coupling, as well as transverse/axial coupling, can be measured.

Configuration (j) shows a module 228 and a module 232. Module 228 has a transmitter antenna 204 in which antenna 204 is tilted. Module 232 has a tri-axial antenna 234. The tri-axial antennas may or may not be co-located. This embodiment shows one possible configuration having tilted/transverse antenna combinations.

Figure 15:
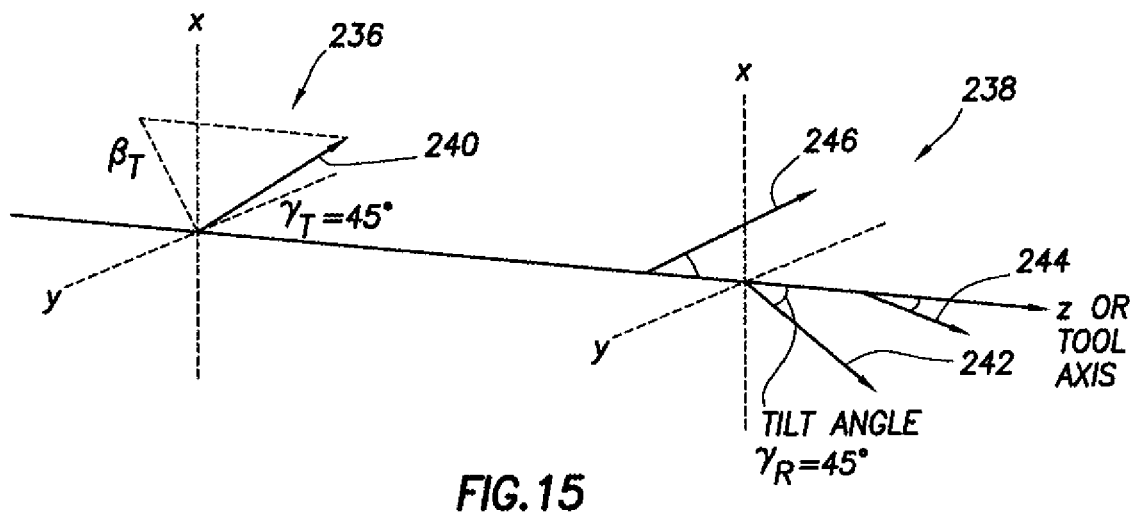
FIG. 15 shows an antenna module in accordance with one embodiment of the present invention.

FIG. 15 shows an embodiment having a module 236 and a module 238. Module 236 has a tilted antenna 240. Module 238 has three tilted antennas 242, 244, 246 that are not co-located, though they could be. The tilt angles of the transmitter and receiver antennas are all equal, but that is not required. The receiver antennas are symmetrically placed azimuthally 120 degrees apart about the longitudinal axis of module 238, but, again, this is not required.

While the relative azimuthal angle between antennas on a common module is known, that may not be true for antennas on separate modules For example, antennas from different modules may be azimuthally rotated relative to one another due to variations in how the drill string is made up at the well site or due to torsional strain while drilling. If rotational sensors are present on each module, the relative azimuth angles can be determined.

When a transmitter antenna (T) is excited and the signal (V) at a receiver (R) is measured, the signal can be related to the orientation and the strength of the T and R dipoles by, $$V = \vec{R} \cdot \overline{\overline{C}} \cdot \vec{T} = \begin{bmatrix} x_R & y_R & z_R \end{bmatrix} \begin{bmatrix} xx & xy & xz \\ yx & yy & yz \\ zx & zy & zz \end{bmatrix} \begin{bmatrix} x_T \\ y_T \\ z_T \end{bmatrix} \quad \text{(EQ. 1)}$$

where, $x_R$, $y_R$, and $z_R$ are components of the vector showing the strength and orientation of the receiver antenna while $x_T$, $y_T$, and $z_T$ are the same for the transmitter antenna. C is the electromagnetic coupling tensor. The yz component of C, for example, is defined as the signal measured by a y directed receiver when a z directed transmitter is excited. An antenna that is oriented along one of the axes has only one component of the T or R vector that is nonzero. An antenna that is tilted has more than one nonzero component in the T or R vector. Below, we will first consider the tilted antenna case.

For a T-R antenna combination where at least one antenna is tilted, the voltage induced at a receiver by an electromagnetic field transmitted from a transmitter is given by Equation (2) which shows the voltage can be expressed in terms of a Fourier series of azimuth angle up to the second order.

$$V(\theta,\beta) = C_0 + C_{1c}\cos(\theta) + C_{1s}\sin(\theta) + C_{2c}\cos(2\theta) + C_{2s}\sin(2\theta); \quad \text{(EQ. 2)}$$

where $\theta$ is the azimuthal tool rotation angle, and we have defined a set of complex coefficients $C_0$, $C_{1c}$, $C_{1s}$, $C_{2c}$, and $C_{2s}$ to represent the $0^{th}$, $1^{st}$, and $2^{nd}$ order harmonic coefficients of the voltage:

$$C_0 = \left[zz + \frac{1}{2}(xx+yy)\cos(\beta) + \frac{1}{2}(xy-yx)\sin(\beta)\right]; \quad \text{(EQ. 3a)}$$

$$C_{1c} = [xz + zx\cos(\beta) + zy\sin(\beta)]; \quad \text{(EQ. 3b)}$$

$$C_{1s} = [yz + zy\cos(\beta) - zx\sin(\beta)]; \quad \text{(EQ. 3c)}$$

$$C_{2c} = \left[\frac{1}{2}(xx-yy)\cos(\beta) + \frac{1}{2}(xy+yx)\sin(\beta)\right]; \quad \text{(EQ. 3d)}$$

$$C_{2s} = \left[\frac{1}{2}(xy+yx)\cos(\beta) - \frac{1}{2}(xx-yy)\sin(\beta)\right]; \quad \text{(EQ. 3e)}$$

where $\beta$ is the azimuth angle of the receiver relative to the transmitter. These equations show dependence on the angle $\beta$ as well as the components of the coupling tensor. The $0^{th}$ order harmonic coefficient depends on the couplings zz, (xx+yy), and (xy−yx). The two $1^{st}$ order harmonic coefficients depend on the couplings xz, zx, yz, and zy; and the two $2^{nd}$ order harmonic coefficients depend on (xx−yy) and (xy+yx).

In normal drilling operation, the tool is rotating while measurements are performed, thus for each T-R pair a plurality of measured voltages are produced according to EQ. 2 with different θ values. When five or more measurements with different, but known, θ values are available, it is possible to determine the harmonic coefficients. This reduces the problem to that of solving the set of equations shown above as EQ. 3. However, EQ. 3 comprises five equations but has nine unknowns, thus is underdetermined. If there are three receivers instead of one, then the equations can be solved and the components of the coupling tensor may be found.

In sliding mode, however, each T-R pair provides one measurement with a known value of θ, thus the task of extracting the Fourier coefficients is not trivial, let alone determining the components of the coupling matrix. But in principle, with enough number of T-R antenna pairs (5 or more) it should be possible to extract the Fourier coefficients and proceed as with the rotating mode discussed above. Such implementation would require one T and five R or its reciprocal: that is, five T and one R antennas. Other implementations such as two T and three R antennas (FIG. 14e) lead to six measurements, enough to extract all Fourier components. Alternatively, one can use three T and three R antennas (FIG. 14f), a combination that leads to nine measurements.

For the cases where there are not enough antennas to extract the components of the coupling tensor, for example, one T and three R antennas in the sliding mode, the following formulation leads to certain combinations of coupling tensor components. Those combinations are directional and thus useful for well placement as well as the determination of resisitivity parameters. Considering the case of one T and three R antennas (FIG. 14d) where at least one antenna is tilted, the combination leads to three measurements; $V_1(\theta, \beta_1)$, $V_2(\theta,\beta_2)$) and $V_3(\theta,\beta_3)$ where the R antennas are azimuthally distributed at 120 degree increments at angles $\beta_1$, $\beta_2$, and $\beta_3$ relative to the transmitter. Using the following relations:

$$\sum_{i=1}^{3}\cos(\beta_i) = \sum_{i=1}^{3}\sin(\beta_i) = \sum_{i=1}^{3}\sin(\beta_i)\cos(\beta_i) = 0 \quad \text{(EQ. 4)}$$

$$2/3\sum_{i=1}^{3}(\cos(\beta_i))^2 = 2/3\sum_{i=1}^{3}(\sin(\beta_i))^2 = 1$$

$$\beta_1 + \beta_2 + \beta_3 = 2\pi$$

the sum of the three measurements will result in a simpler relationship.

$$M_1 = 1/3\sum_{i=1}^{3}V_i(\theta, \beta_i) = zz + zx\cos(\theta) + zy\sin(\theta) \quad \text{(EQ. 5a)}$$

Similarly, $$M_2 = 2/3\sum_{i=1}^{3}V_i(\theta, \beta_i)\cos(\beta_i) = \frac{xx+yy}{2} + xz\cos(\theta) + \quad \text{(EQ. 5b)}$$
$$yz\sin(\theta) + \frac{xx-yy}{2}\cos(2\theta) + \frac{xy+yx}{2}\sin(2\theta)$$

and $$M_3 = 2/3\sum_{i=1}^{3}V_i(\theta, \beta_i)\sin(\beta_i) = \frac{yx-xy}{2} + yz\cos(\theta) + \quad \text{(EQ. 5c)}$$
$$xz\sin(\theta) + \frac{xy+yx}{2}\cos(2\theta) + \frac{xx-yy}{2}\sin(2\theta)$$

The expressions in EQ. 5 are simpler than the equations for the raw voltages and are easier to calculate. These relations all contain cross terms such as xz, zy, etc that make them directional quantities. Forward model calculation based on EQ. 5 can be used and the components of the coupling tensor can be iteratively varied to reproduce the experimentally measured values. The components of the coupling tensor can then be used to determine distances to bed boundaries and resistivity parameters such as vertical resisitivity, horizontal resisitivity, formation dip, and azimuth. Thus this method makes it possible to use the three measurements obtained from one T and three R antennas for well placement and resistivity determination even in sliding mode.

In the particular case where the formation is made of parallel layers, the so called "planar geometry", it is advantageous to rotate, say by angle α, the measurements such that the x axis of the tool frame is perpendicular to the plane of the formation. In such conditions, the cross terms in the coupling tensor involving the y axis (xy, yx, zy, and yz) vanish and EQ. 5 is further simplified to:

$$M_{1P} = 1/3\sum_{i=1}^{3}V_i(\theta - \alpha, \beta_i) = zz + zx\cos(\theta - \alpha) \quad \text{(EQ. 6a)}$$

$$M_{2P} = 2/3\sum_{i=1}^{3}V_i(\theta - \alpha, \beta_i)\cos(\beta_i) \quad \text{(EQ. 6b)}$$
$$= \frac{xx+yy}{2} + xz\cos(\theta - \alpha) + \frac{xx-yy}{2}\cos(2(\theta - \alpha))$$

and

-continued $$M_{3P} = 2/3\sum_{i=1}^{3}V_i(\theta - \alpha, \beta_i)\sin(\beta_i) \quad \text{(EQ. 6c)}$$
$$= xz\sin(\theta - \alpha) + \frac{xx-yy}{2}\sin(2(\theta - \alpha))$$

These equations are even easier to work with, but they apply only to the special case of planer geometry.

Figure 16:
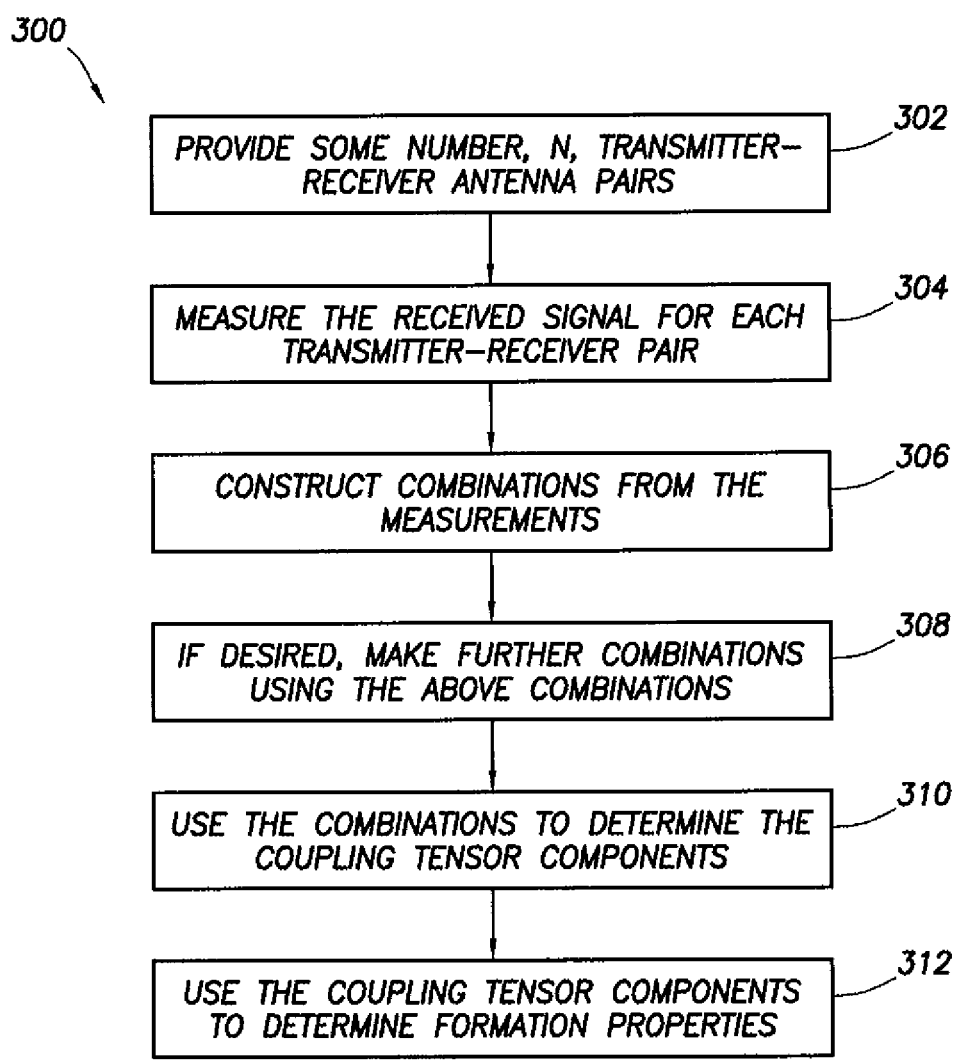
FIG. 16 shows a flowchart illustrating the steps of the method in accordance with one embodiment of the present invention.

The procedure of obtaining the quantities shown in equations 5 or 6 is to start with three measurements and construct some combinations of those measurements that have more desirable properties, as shown in FIG. 16. In general with three independent measurements, one can construct other three independent combinations, as was shown above. But the procedure is not limited to the combinations listed above, and in general many other combinations are possible. Some combinations may be further combinations of the relations shown in EQ. 6, for example, $$M_{4P} = 2(M_{2P}\sin(2(\theta - \alpha)) - M_{3P}\cos(2(\theta - \alpha))) \quad \text{(EQ. 7)}$$
$$= xz\sin(\theta - \alpha) + \frac{xx+yy}{2}\sin(2(\theta - \alpha))$$

In contrast to the relations in EQ. 6, all the terms in EQ. 7 depend on the angular position of the tool. Thus the method of this inventions allows combinations with desired properties to be constructed using the measured voltages.

The method is now applied to the axial and transverse antennas. The axial antennas have dipole directions along the z axis (defined as the longitudinal axis of the tool) while the transverse antennas have their dipoles perpendicular to the z axis. When there are three mutually perpendicular antennas, the set is called tri-axial antennas. If a tri-axial transmitter antenna and a tri-axial receiver antenna are present, nine measurements are performed in sliding mode. If both modules are equipped with a directional sensor, the relative angle between transverse antennas will be known and EQ. 1 can be used to determine all components of the coupling tensor. Thus well placement and resistivity parameter determination are possible. In cases where fewer antennas are present, for example, if only one transmitter is coupled with a tri-axial receiver (FIG. 14*i*), only some of the coupling tensor components can be determined. Those components are sufficient, however, to determine the resistivity parameters.

Consider the case of an axial T and a tri-axial R antenna system and assume the R antennas are rotated by an azimuthal angle θ relative to the up direction. The three measured voltages are:

$$V_{1t} = xz\cos(\theta) \quad \text{(EQ. 8a)}$$

$$V_{2t} = yz\sin(\theta) \quad \text{(EQ. 8b)}$$

$$V_{3t} = zz \quad \text{(EQ. 8c)}$$

Thus after corrections are made for azimuthal angle, xz, yz, and zz can be determined, where the first two are directional. Similarly, if a tri-axial R and an x directed transverse T are present after azimuthal angle correction, xx, yx, and zx are determined where all three components are directional. It is clear that with axial and transverse antennas one needs only a T and three R antennas to operate in a sliding mode. However, preferable parameters such as symmetrized and anti-symmetrized functions can not be derived from these measurements.

FIG. 16 shows the steps of one embodiment 300 of the method to determine a formation property while in sliding mode.

The method and apparatus to determine a formation property while the apparatus is sliding is applicable regardless of whether the antennas are distributed on or within multiple modules or carried on or within a single module. The apparatus may be conveyed on a drilling string or a wireline and may slide using either type of conveyance.

Though the embodiments above are described in terms of propagation tools, the invention also includes induction tools. If induction tools are used, other antennas, known in the art as bucking coils, may be disposed at various locations along the drill string.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A modular downhole apparatus to determine a formation property, the apparatus being incorporated into a drill string comprising one or more downhole tools and drill pipe, the drill pipe being of the same or various lengths, the modular downhole apparatus comprising:
   a first module having one or more antennas, wherein the first module has connectors on both ends and is removeably connected to the drill string; and
   a second module having one or more antennas, wherein the second module has connectors on both ends and is removeably connected to the drill string;
   wherein the first module and the second module are spaced apart on the drill string; and
   wherein one or more of the one or more antennas of one or both of the modules has a dipole moment that is tilted or transverse.

2. The modular downhole apparatus of claim 1, wherein the one or more antennas having a tilted dipole moment comprise at least two antennas having equal tilt angles.

3. The modular downhole apparatus of claim 2, wherein the at least two antennas having equal tilt angles have different azimuthal angles.

4. The modular downhole apparatus of claim 1, wherein the one or more antennas having a transverse dipole moment comprise at least two transverse antennas.

5. The modular downhole apparatus of claim 4, wherein the at least two transverse antennas have different azimuthal angles.

6. The modular downhole apparatus of claim 1, wherein the one or more antennas having a tilted or transverse dipole moment comprise at least two antennas wherein one antenna has a tilted dipole moment and the other antenna has a transverse dipole moment.

7. The modular downhole apparatus of claim 6, wherein the at least two antennas have different azimuthal angles.

8. The modular downhole apparatus of claim 1, wherein one or more of the one or more antennas in one or both of the modules are co-located.

9. The modular downhole apparatus of claim 1, further comprising one or more additional modules, each additional module having one or more antennas, wherein each additional module has connectors on both ends adapted to connect with the drill string.

10. The modular downhole apparatus of claim 9, wherein one or more of the one or more antennas in one of the modules transmits a signal that is received by two or more antennas located in the other modules, and the received signals are used as absolute signals, combined to produce relative signals, or combined to produce borehole compensated signals.

11. The modular downhole apparatus of claim 1, wherein one or more of the one or more antennas in one or both of the modules comprises a transceiver.

12. The modular downhole apparatus of claim 1, wherein at least one of the modules comprises a conventional resistivity tool.

13. The modular downhole apparatus of claim 1, wherein the one or more antennas of one or both of the modules comprise transmitter antennas and receiver antennas.

14. The modular downhole apparatus of claim 1, wherein the spacing between the modules is proportional to a desired depth of investigation.

15. The modular downhole apparatus of claim 1, wherein one of the modules includes a drill bit.

16. The modular downhole apparatus of claim 1, wherein one or more of the one or more antennas in one or both of the modules are operable at a plurality of frequencies.

17. The modular downhole apparatus of claim 1, wherein the formation property includes a horizontal resistivity, a vertical resistivity, a relative dip, a bed orientation angle, a distance-to-bed boundary, or a bed boundary indicator.

18. A method to determine a formation property, comprising:
   providing a modular downhole apparatus, the apparatus being incorporated into a drill string comprising one or more downhole tools and drill pipe, the drill pipe being of the same or various lengths;
   transmitting a signal from a first module having one or more antennas, wherein the first module has connectors on both ends and is removeably connected to the drill string;
   receiving the signal in a second module having one or more antennas, wherein the second module has connectors on both ends and is removeably connected to the drill string; and
   using the received signal to determine the formation property;
   wherein one or more of the one or more antennas of one or both of the modules has a dipole moment that is tilted or transverse.

19. The method of claim 18, wherein the transmitting is performed using one or more frequencies.

20. The method of claim 18, wherein the transmitting is in accordance with a selected pulse scheme.

21. The method of claim 20, wherein the selected pulse scheme comprises a train of transmitter pulses having different frequencies.

22. A modular downhole apparatus to determine a formation property, the apparatus being incorporated into a drill string comprising one or more downhole tools and drill pipe, the drill pipe being of the same or various lengths, the modular downhole apparatus comprising:
   a first module having two or more tilted antennas having equal first tilt angles and azimuthally distributed about a longitudinal axis of the first module, wherein the first module has connectors on both ends and is removeably connected to the drill string; and
   a second module having two or more tilted antennas having equal second tilt angles and azimuthally distributed about a longitudinal axis of the second module, wherein the second module has connectors on both ends and is removeably connected to the drill string;

wherein the first module and the second module are spaced apart on the drill string.

23. The modular downhole apparatus of claim 22, wherein the first and second tilt angles are equal.

24. The modular downhole apparatus of claim 22, wherein the azimuthal distribution is evenly spaced.

25. The modular downhole apparatus of claim 22, wherein the formation property includes a horizontal resistivity, a vertical resistivity, a relative dip, a bed orientation angle, a distance-to-bed boundary, or a bed boundary indicator.

26. A method to determine a formation property, comprising:

providing a modular downhole apparatus, the apparatus being incorporated into a drill string comprising one or more downhole tools and drill pipe, the drill pipe being of the same or various lengths;

transmitting a signal from a first module having one or more antennas while the first module is sliding, wherein the first module has connectors on both ends and is removeably connected to the drill string;

receiving the signal in a second module having one or more antennas while the second module is sliding, wherein the second module has connectors on both ends and is removeably connected to the drill string; and using the received signal to determine the formation property;

wherein one or more of the one or more antennas of one or both of the modules has a dipole moment that is tilted or transverse.

* * * * *